US012461030B2

(12) United States Patent
Singer et al.

(10) Patent No.: US 12,461,030 B2
(45) Date of Patent: Nov. 4, 2025

(54) POINT OF CARE VIRAL DETECTION SYSTEM USING TURBO FLUORESCENCE IN SITU HYBRIDIZATION

(71) Applicant: Northeastern University, Boston, MA (US)

(72) Inventors: Brenna Singer, Gansevoort, NY (US); Bridget Bergstrom, Maple Grove, MN (US); Sarah M. Dunbar, Brookhaven, NY (US); Francheska Torres, Charlton, MA (US); Alana Persing, Allston, MA (US); Kelsey M. Dupont, Revere, MA (US); Timothy Lannin, Hopkinton, MA (US); Jeffrey Ruberti, Lexington, MA (US)

(73) Assignee: Northeastern University, Boston, MA (US)

( * ) Notice: Subject to any disclaimer, the term of this patent is extended or adjusted under 35 U.S.C. 154(b) by 350 days.

(21) Appl. No.: 17/692,078

(22) Filed: Mar. 10, 2022

(65) Prior Publication Data
US 2022/0288586 A1 Sep. 15, 2022

Related U.S. Application Data

(60) Provisional application No. 63/159,423, filed on Mar. 10, 2021.

(51) Int. Cl.
*G01N 21/64* (2006.01)
*B01L 3/00* (2006.01)
(Continued)

(52) U.S. Cl.
CPC .... *G01N 21/6428* (2013.01); *B01L 3/502715* (2013.01); *B01L 3/502723* (2013.01); *G01N 21/6454* (2013.01); *G01N 33/582* (2013.01); *B01L 2200/0684* (2013.01); *B01L 2200/10* (2013.01); *B01L 2200/16* (2013.01);
(Continued)

(58) Field of Classification Search
None
See application file for complete search history.

(56) References Cited

U.S. PATENT DOCUMENTS

| 8,911,685 B2 * | 12/2014 | Watanabe | G01N 35/1002 |
| | | | 422/519 |
| 11,130,994 B2 * | 9/2021 | Shachar | G11C 13/0019 |

(Continued)

FOREIGN PATENT DOCUMENTS

WO 2021243035 A1 12/2021

OTHER PUBLICATIONS

Maarten Jan Koster, A compact fluorescence detection system that uses a DVD pickup for the optical detection of beads, University of Twente (Year: 2011).*

(Continued)

*Primary Examiner* — Maris R Kessel
*Assistant Examiner* — Mickey Huang
(74) *Attorney, Agent, or Firm* — Verrill Dana, LLP

(57) ABSTRACT

Devices and methods for automated liquid handling and reagent processing to provide labelling and detection of bacteria and viruses are provided. Labelling reactions are performed rapidly and with essentially no generation of hazardous waste or use of consumables. Highly sensitive detection is performed by measuring fluorescence on a rotating sample plate.

7 Claims, 26 Drawing Sheets

(51) Int. Cl.
  *G01N 1/22* (2006.01)
  *G01N 33/58* (2006.01)
(52) U.S. Cl.
  CPC .......... *B01L 2300/0663* (2013.01); *B01L 2300/0803* (2013.01); *B01L 2300/161* (2013.01); *G01N 1/22* (2013.01); *G01N 2001/2244* (2013.01); *G01N 21/6402* (2013.01); *G01N 2021/6463* (2013.01); *G01N 2800/26* (2013.01)

(56) References Cited

U.S. PATENT DOCUMENTS

| | | | | |
|---|---|---|---|---|
| 2002/0012916 | A1* | 1/2002 | Gundling | G01N 35/02 435/7.1 |
| 2006/0223169 | A1* | 10/2006 | Bedingham | G01N 21/645 356/323 |
| 2006/0223172 | A1* | 10/2006 | Bedingham | G01N 21/6428 356/417 |
| 2009/0309049 | A1* | 12/2009 | Van Dijk | G01J 3/10 250/236 |
| 2010/0270478 | A1* | 10/2010 | Wimberger-Friedl | G01N 21/6456 250/216 |

OTHER PUBLICATIONS

Rahmani, A.R. et al., "Sampling and detection of corono viruses in air: A mini review", Science of the Total Environment, 740 (2020), 7 pgs.

* cited by examiner

POINT OF CARE VIRAL DETECTION SYSTEM USING TURBO FLUORESCENCE IN SITU HYBRIDIZATION

CROSS-REFERENCE TO RELATED APPLICATIONS

This application claims priority to U.S. Provisional Application No. 63/159,423, filed 10 Mar. 2021, entitled "Point of Care Viral Detection System Using Turbo Fluorescence In Situ Hybridization", the entirety of which is incorporated herein by reference.

STATEMENT REGARDING FEDERALLY SPONSORED RESEARCH OR DEVELOPMENT

This invention was made with government support under Grant Number NSF 2032501 awarded by the National Science Foundation. The government has certain rights in the invention.

BACKGROUND

In late 2019 the coronavirus SARS-CoV-2, which causes the disease COVID-19, began spreading. The highly contagious coronavirus has rapidly spread, resulting in the inundation of the international patient care resources and the COVID-19 pandemic. Testing of individuals with and without symptoms and of individuals suspected of infection has been a key to preventing spread, but testing has typically required reverse transcription polymerase chain reaction (rtPCR) applied to upper or lower respiratory specimens. The rtPCR specimens are usually obtained by nasopharyngeal swabbing, and the rtPCR test results can take days. To lower future case numbers, a more efficient and accurate point of care system is needed to limit transmission of the virus. This will allow people to quarantine faster and stop the spread. Faster testing methods and readily deployable tests are urgently needed for pathogen testing.

Rahmani, et al. provides a review of the current state of the art for sampling and detecting SARS-CoV-2 and other corona viruses in the air (Rahmani, et al., 2020). In this review, sampling techniques are classified into dry and wet collections. The dry collection typically involves filtration, while the wet collection typically involves impinging on or bubbling through a liquid bath. Both sample collection techniques have pros and cons. Filtration is efficient at collecting virus but can be destructive to the virus and requires significant time-consuming post-processing to release the virus from the filter for testing. Wet collection typically results in intact viable viruses in a convenient transport medium; however, the large collection volume and the lower collection efficiency means that high viral loads or long sampling times are needed (Rahmani, et al., 2020). Once a sample is collected, the rtPCR is both sensitive and selective, but it is not rapid and can take hours or days to obtain a reading. Systems and methods are urgently needed for rapid detection of microbial pathogens after sample collection, and there are no systems capable of both rapid accuracy and precision.

SUMMARY

The present technology provides an automated liquid handling processing system for rapidly fixating, washing, and fluorescently labeling microbial pathogens collected on a detection surface of a sample disc. The microbial pathogens can be collected on the detection surface of the disc by a variety of sampling methods. After labeling the microbial pathogens, the processing system can automatically wash the detection surface of any residual labeling solution, and the labeled microbial pathogens are ready for detection. The processing system can continuously process sample discs. Processing of an individual detection surface of a sample disc can be accomplished in minutes.

The technology also provides a fast and accurate detection system for fluorescently labeled microbial pathogens. The sample disc with the labeled microbial pathogens on the detection surface is placed into the detection system. The detection system is capable of scanning an entire sample detection surface or sample collection zone, with accurate results delivered in minutes.

The present technology can be further summarized by the following list of features.

1. A device for detection of a fluorescently labeled analyte deposited on a detection surface of a disc the device comprising:
    a rotator operative to continuously rotate the disc;
    a laser operative to irradiate the analyte on the disc with excitation light capable of exciting a fluorophore bound to the analyte, wherein the laser is mounted on a scanning mechanism and irradiates a spot on the detection surface while the disc is scanned radially across the rotating disc;
    a detector coupled to the scanning mechanism and operative to detect fluorescence emission from the fluorophore during the scan; and
    an analysis module that collects fluorescence emission data from the detector and stores, analyzes, and/or transmits the data to provide a measure of the analyte deposited on the disc.
2. The device of feature 1, wherein the detector comprises a dichroic long pass filter with a reflection wavelength band in the range from about 350 nm to at least about the excitation wavelength and a transmission wavelength band comprising at least a portion of an emission wavelength range of the fluorophore.
3. The device of feature 1 or feature 2, wherein the detector further comprises an autofocus mechanism capable of changing a distance between the detector and the detection surface.
4. The device of feature 3, wherein the autofocus mechanism is capable of maintaining the detector at a constant distance from the detection surface during scanning of the disc.
5. The device of any of the preceding features, wherein the detector comprises a photomultiplier tube, a charge-coupled device (CCD), a photodiode-array (PDA), or an optical pickup (OPU).
6. The device of any of the preceding features, wherein the laser has one or more of the following characteristics: an illumination intensity of about $10^8$ mW/mm$^2$, a spot size in the range from about 150 nm to about 250 nm, and a wavelength of about 405 nm.
7. The device of any of the preceding features, wherein the irradiated spot has a diameter of about 250 nm.
8. The device of any of the preceding features, wherein the analyte is a molecular component of a pathogenic microorganism.
9. The device of feature 8, wherein the pathogenic microorganism is a virus or bacterium that causes a respiratory disease.
10. The device of feature 9, wherein the pathogenic microorganism is SARS-CoV-2.

11. The device of any of the preceding features, wherein the disc comprises glass and the analyte is fixed onto the detection surface of the disc via evaporation of a solvent.
12. The device of any of the preceding features, wherein the fluorophore is coupled to an antibody, an aptamer, or an oligonucleotide.
13. A device for fluorescently labeling an analyte disposed on a detection surface of a sample disc, the device comprising:
   a circular disc holder capable of incremental, intermittent rotation around a central axis and having an outer edge an inner edge, and an empty center region, the disc holder comprising a plurality of incrementally spaced sample disc holders disposed between the outer edge and inner edge;
   one or more stationary reagent dispensing stations disposed in the center region near the inner edge of the disc holder;
   one or more cleaning vessels disposed within the center region; and
   a control module;
   wherein each dispensing station comprises two oppositely disposed dispensing/aspirating tubes capable of rotation to access either a sample disc in the disc holder or said one or more cleaning vessels;
   wherein each dispensing station further comprises a rotation and dipping mechanism operative to place one of said dispensing/aspirating tubes above a sample disc for dispensing and/or aspirating a reagent to or from a sample disc or to place one of said dispensing/aspirating tube into said one or more cleaning vessels for cleaning; and
   wherein the control module is configured to, according to a program, incrementally and intermittently rotate the circular disc holder, actuate selected reagent dispensing stations to dispense reagents onto the disc or aspirate reagents from the disc using said dispensing/aspirating tubes, and to deposit the dispensing/aspirating tubes into said one or more cleaning vessels.
14. The device of feature 13, wherein rotation of the circular disc holder advances intermittently at intervals of about 15 seconds to about 30 seconds.
15. The device of feature 13 or feature 14, wherein a full rotation of the circular disc holder is completed in about 10 minutes to about 15 minutes.
16. The device of any of features 13-15, wherein fluorescently labeling the analyte is accomplished with one complete rotation of the circular disc holder.
17. The device of any of features 13-16, wherein the device further comprises a temperature control mechanism to maintain reagents and/or sample discs as a desired temperature.
18. The device of any of features 13-17, wherein the device is configured for performing fluorescence in situ hybridization (FISH) of nucleic acid-containing samples disposed on said sample disc.
19. The device of any of features 13-18, wherein the reagent dispensing stations are configured for dispensing a fluorescently labeled antibody, aptamer, or oligonucleotide, or a buffer, washing solution, permeabilizing agent, or solvent.
20. The device of any of features 13-19, wherein the device is configured for detection of an analyte that is a molecular component of a pathogenic microorganism.
21. The device of feature 20, wherein the pathogenic microorganism is a virus or bacterium that causes a respiratory disease.
22. The device of feature 21, wherein the pathogenic microorganism is SARS-CoV-2.
23. The device of any of features 13-22, wherein the one or more cleaning vessels comprise a heating mechanism and/or a cleaning solution.
24. A method for detecting a fluorescently labeled analyte deposited on a sample disc, the method comprising:
   (a) providing a sample disc comprising a sample deposited on a sample surface of the disc, wherein the sample is suspected of comprising a fluorescently labeled analyte;
   (b) scanning the sample surface of the disc with a device according to any of features 1-13, whereby fluorescence from the fluorescently labeled analyte is detected.
25. The method of feature 24, wherein the entire sample surface is scanned in less than about 5 minutes and a detection accuracy for detecting the fluorescently labeled analyte is at least 95%.
26. The method of feature 24 or feature 25, further comprising:
   (a1) labeling an analyte deposited on a sample surface of a sample disc using the device of any of features 13-23.
27. The method of any of features 24-26, further comprising:
   (a0) collecting aerosol droplets from exhaled breath of a subject on the sample surface of the sample disc.
28. The method of any of features 24-27, wherein the analyte is a molecular component of a pathogenic microorganism.
29. The method of feature 28, wherein the pathogenic microorganism is a virus or bacterium that causes a respiratory disease.
30. The method of feature 29, wherein the pathogenic microorganism is SARS-CoV-2.
31. An analyte detection system comprising the device of any of features 1-12 and the device of any of features 13-23.

As used herein, the terms "microbial pathogen" and "pathogenic microorganism" refer to microorganisms including viruses, bacteria, and other microorganisms that can infect any part of the respiratory system.

As used herein, the term "about" refers to a range of within plus or minus 10%, 5%, 1%, or 0.5% of the stated value.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with the alternative expression "consisting of" or "consisting essentially of".

DETAILED DESCRIPTION

The present technology provides highly accurate, rapid, and low-cost testing for a variety of microbial pathogens such as SARS-CoV-2. The technology provides an automated fluid handling system for continuously fixating, washing, and labelling of microbial pathogens disposed on a detection surface of a disc. After the microbial pathogens are labeled or probed on the detection surface, detection of the labeled microbial pathogens could take hours or day, so the technology provides an automated detection system for detecting a labeled microbial pathogen on a detection surface of a disc that can be completed in minutes.

After collection of a sample on a detection surface of a disc, an automated fluid handling system can conduct a Turbo Fluorescence in Situ Hybridization (Turbo FISH) assay to label nucleic acid molecules of collected viral particles with fluorescently tagged oligonucleotide probes. A fluorescence detection system then scans the detection surface. A laser excites the fluorophores, and the emitted light is detected and counted. The system is designed with the goal of obtaining results in less than about 15 minutes after the time of detection surface processing in the automated fluid handling system, without the need for complex processes requiring lab training.

Figure 1:
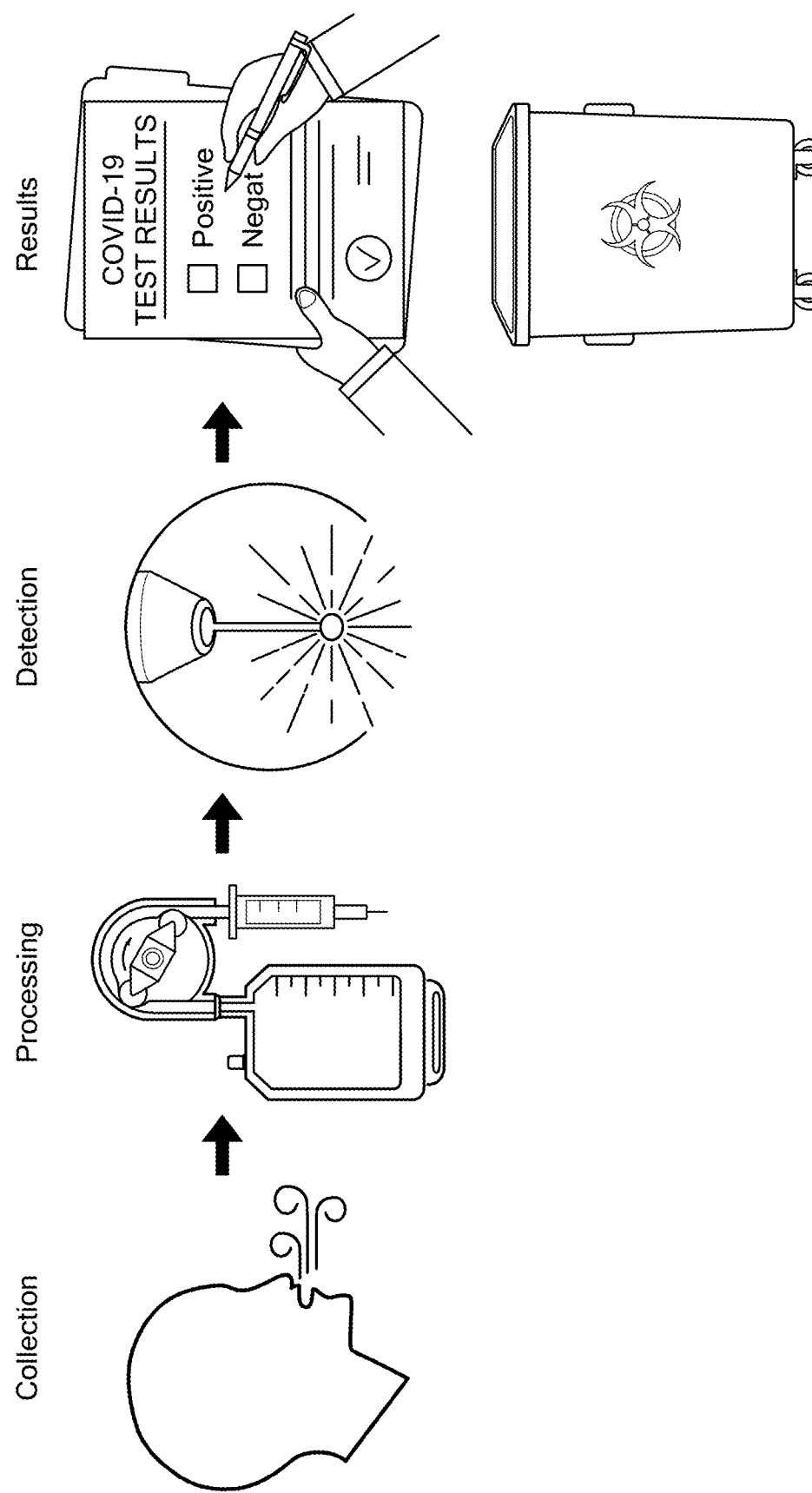
FIG. 1 shows an illustration of a sample disc at bottom and method steps (top) of detecting a microbial pathogen including sample collection, sample processing (e.g., to label any suspected pathogens), detection of labeled microbial pathogens, and results.

Detecting a suspected microbial pathogen from an environment or from a subject typically begins with collecting a sample. For example, detecting a microbial pathogen in an exhaled breath sample on a collection plate requires several steps. FIG. 1 shows an example of required steps including sample collection on a sample disc 520, sample processing, detection, and generation of results.

Figure 2:
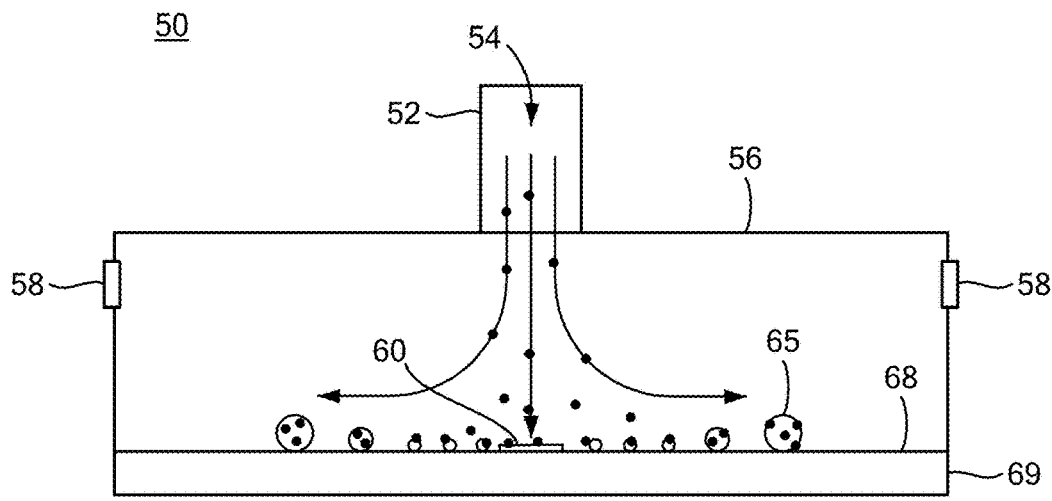
FIG. 2 shows an example device for collecting a sample on a detection surface of a sample disc.

The sample collection can be provided by any suitable method. FIG. 2 shows an illustration of a device 50 for collecting an exhaled breath 54 on a detection surface of a disc. The exhaled breath 54 enters an inlet 52 and an outer shield 56 over a detection surface 68. Excess breath exits the outer shield through vents 58. The inlet directs the exhaled breath towards a detection surface 68, and the exhaled breath condenses at an impact area 60 to form droplets 65, which are pushed away from the impact area by a sheer force of the breath. The substrate 69 of the surface can include a hydrophilic and transparent material, for example glass. Additional sample collection methods are described in PCT International Publication Number WO 2021/243035 A1, which is incorporated by reference herein in its entirety.

A sample can be collected using a swab, then a detection surface of a disc can be contacted with the swap to transfer the sample to the detection surface. Samples can be collected by contacting an environment with a solid detection surface of a disc. Methods of collecting a sample on a solid detection surface of a disc can be any suitable method known in the art.

Figure 3:
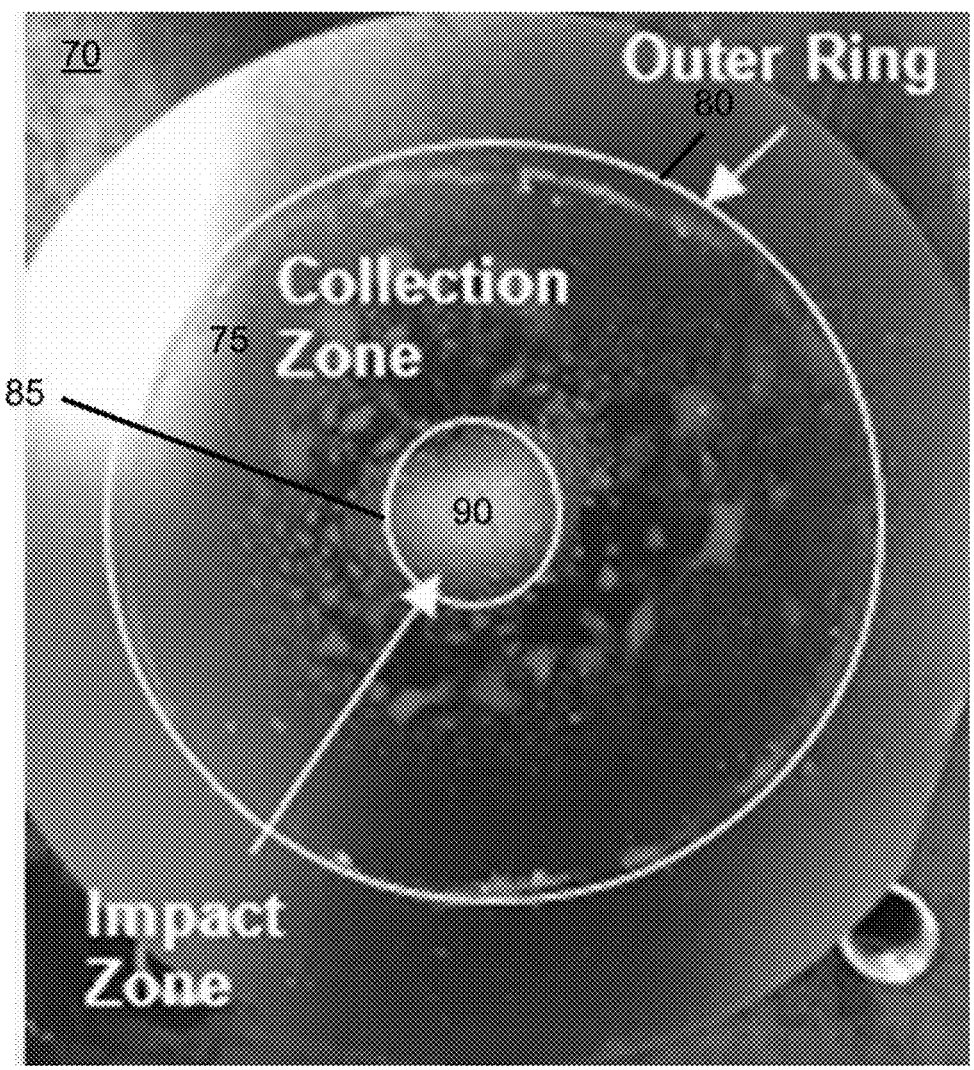
FIG. 3 shows an example photo of a sample collection zone on a detection surface of a disc.

If a gaseous sample is directed towards a surface, in general, any condensation process can form drops that are pushed away from an impact area of the gas with the surface by a shear force. In FIG. 3, an example photo 70 of a sample on a detection surface of a disc shows an impact zone 90 of sample (white) surrounded by circle 85. An outer ring 80 surrounds the circle 85. A collection zone 75 is an area of interest of scanning where suspected microbial pathogens could be found. Microbial pathogens on the collection zone can be labeled with a solution including a fluorescent probe specific to the pathogens to aid detection. After the solution is applied, excess solution must be washed off.

Figure 4:
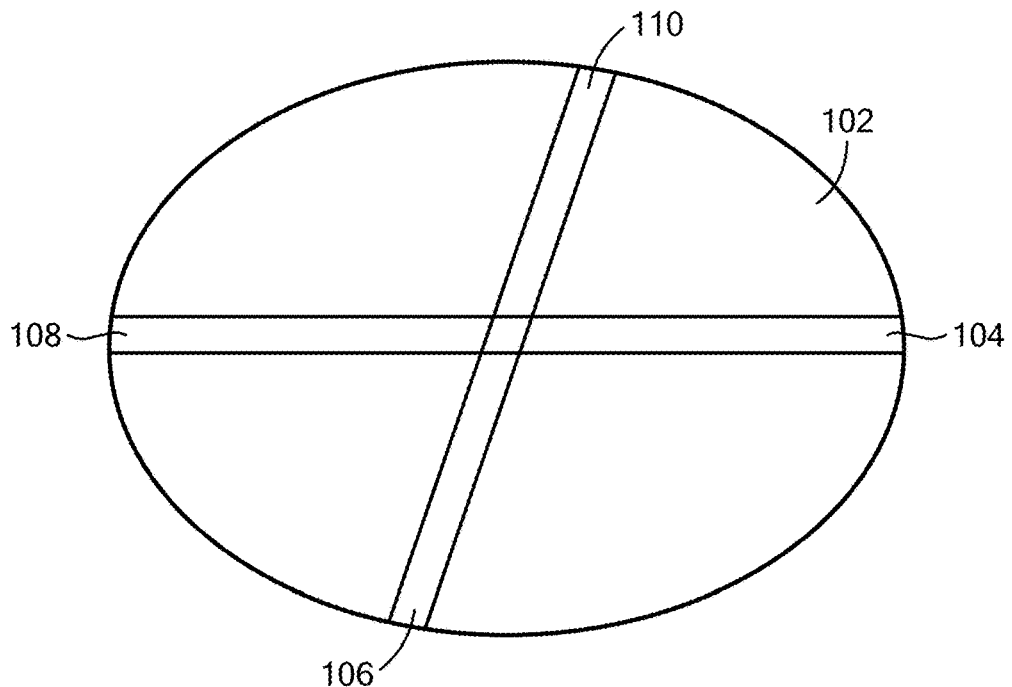
FIG. 4 shows a perspective view of an example detection surface of a sample disc including reflective areas on top of the sample surface.

To implement the technology disclosed herein, an optional hydrogel coating can be included on the substrate or the glass. The substrate can optionally include a reflective focus strip to aid focus during detection, or a reflective material can be applied after sample collection. For an accurate detection of labeled microbial pathogens on a detection surface of a disc, a detector should be focused directly on the collection zone and at the detection surface. Detection surfaces utilized in the technology can include one or more reflective partial coatings, strips, or surfaces for autofocusing of a detector. FIG. 4 shows an example detection surface of a disc 102 with one or more reflective strips 104, 106, 108, and 110 on the top, on the same side as the microbial pathogens for detection. The one or more reflective strips can be applied after a sample is collected on the detection surface 102 or before. The one or more reflective strips can be sprayed on, for example, with a reflective paint. The one or more reflective strips can include a reflective metal foil or coating. The one or more reflective strips can be any shape. During detection of labeled microbials on the top detection surface 102 in FIG. 4, laser light is transmitted up through the material 102 and is reflected back through for autofocusing.

Figure 5:
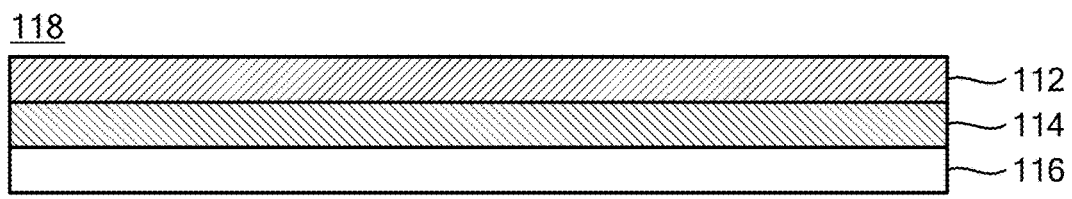
FIG. 5 shows an example of layers of a detection surface of a sample disc for detection of a microbial pathogen.
Figure 6:
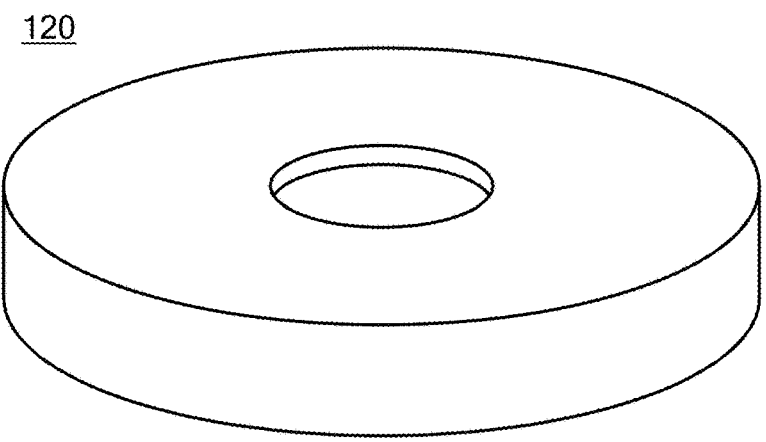
FIG. 6 shows a model of an example surface including a center hole.
Figure 7:
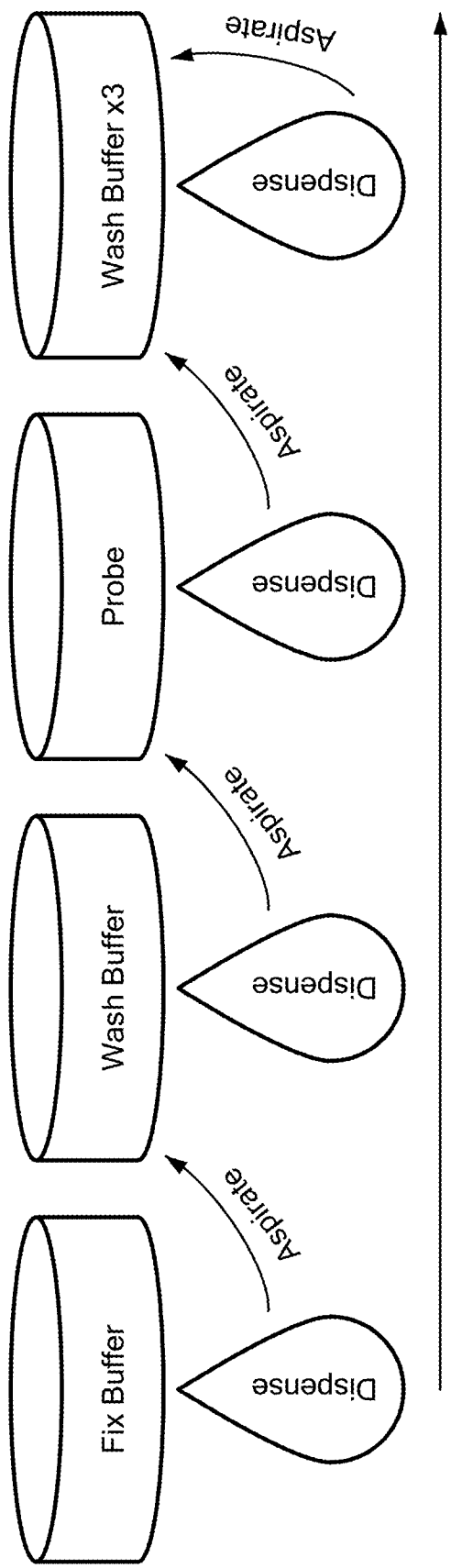
FIG. 7 shows an example of method steps for labeling microbial pathogens on a detection surface of a sample disc including dispensing a fixation buffer, aspirating off excess, dispensing a wash buffer, aspirating off excess, dispensing a labeling or probe solution, aspirating off excess, and dispensing a wash buffer three times, with each dispensing followed by aspirating off excess wash.

FIG. 5 shows an example 118 of layers that can be included in a detection surface of a disc. A transparent layer 116 includes an optional thin hydrogel layer 114 with a reflective layer 112 on top. The reflective layer does not extend over the entire detection surface of the disc 114 or 116 and can be applied after a sample collection on the hydrogel. If the hydrogel layer is not present, the reflective layer is directly on top of the transparent layer. In another example, FIG. 6 shows an example 120 of a prototype model that was tested After a sample suspected of containing a microbial pathogen is collected on a detection surface of a disc, accurate detection of any microbial pathogens of interest (e.g., SARS-CoV-2) on the detection surface requires scanning a statistically significant surface area of the detection surface with high accuracy. To continuously scan a large sample over long periods for a small number of dangerous microbial pathogens with high-sensitivity, high-specificity and in nearly real-time requires that multiple problems are solved simultaneously. For example, these can include: 1) labelling the microbial pathogen efficiently and uniquely; 2) concentrating the signal; 3) scanning large areas at high-resolution (e.g., wide field microscopy); and 4) minimizing consumables and maintenance of the system. To address the first problem of labeling, FIG. 7 shows an example of method steps for labeling microbial pathogens on a detection surface of a disc including dispensing a fixation buffer, aspirating off excess, dispensing a wash buffer, aspirating off excess, dispensing a labeling or probe solution, aspirating off excess, and dispensing a wash buffer three times, with each dispensing followed by aspirating off excess. If done manually, these steps take considerable time and skill.

Automated liquid handling is required to reduce the time required and to process many sample discs with samples suspected of containing a targeted microorganism. The automated liquid handling disclosed herein can be configured to perform the example method steps depicted in FIG. 7 or other required method steps to label a microbial pathogen on a detection surface of a disc. By changing the start processing location or the configurations described below, the automated liquid handling systems can be configured to provide almost any liquid handling method.

Figure 8A:
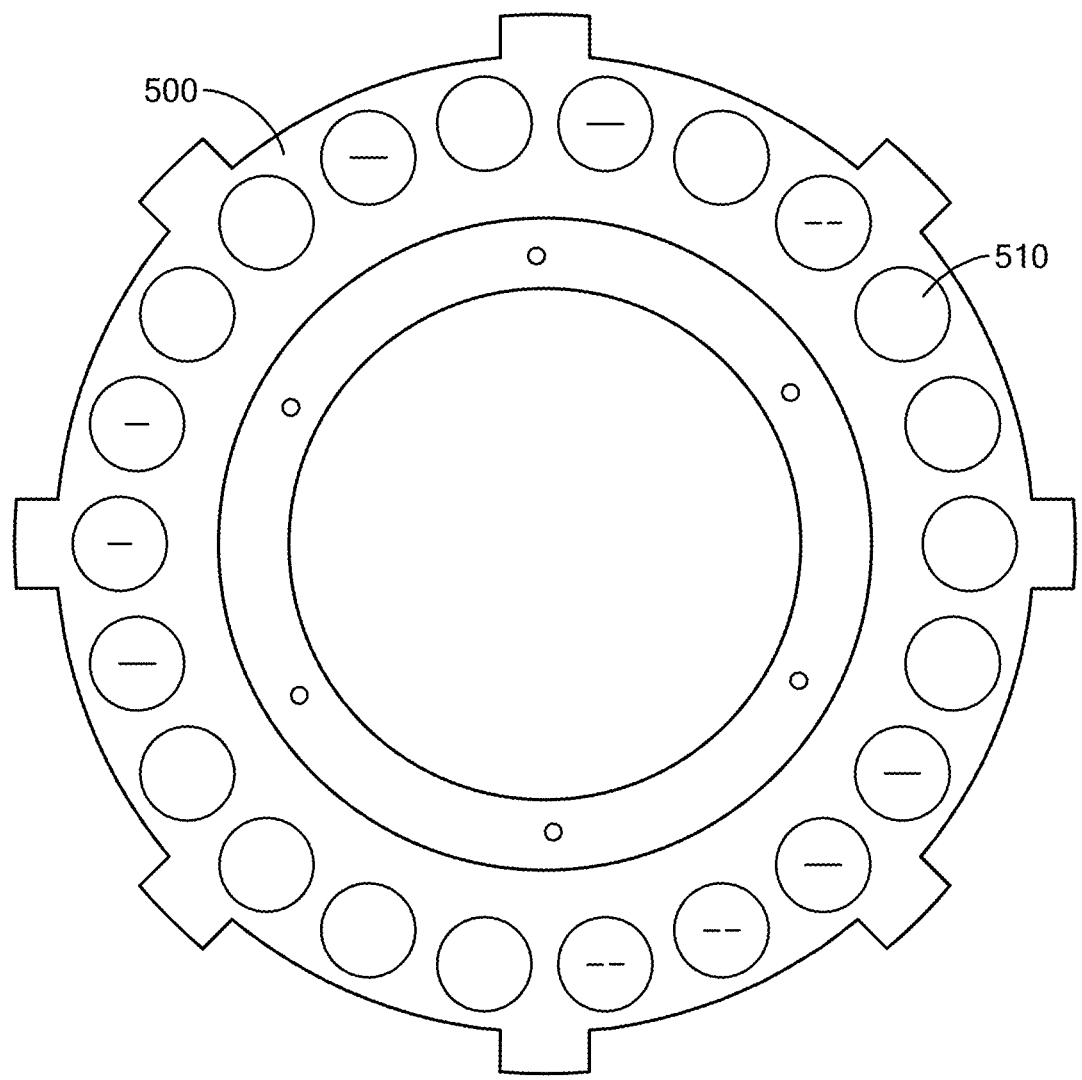
FIG. 8A shows a top view of a circular disc holder with incrementally spaced sample holders, each sample holder capable of holding a sample disc suspected of containing microbial pathogens on the detection surface of the disc.
Figure 8B:
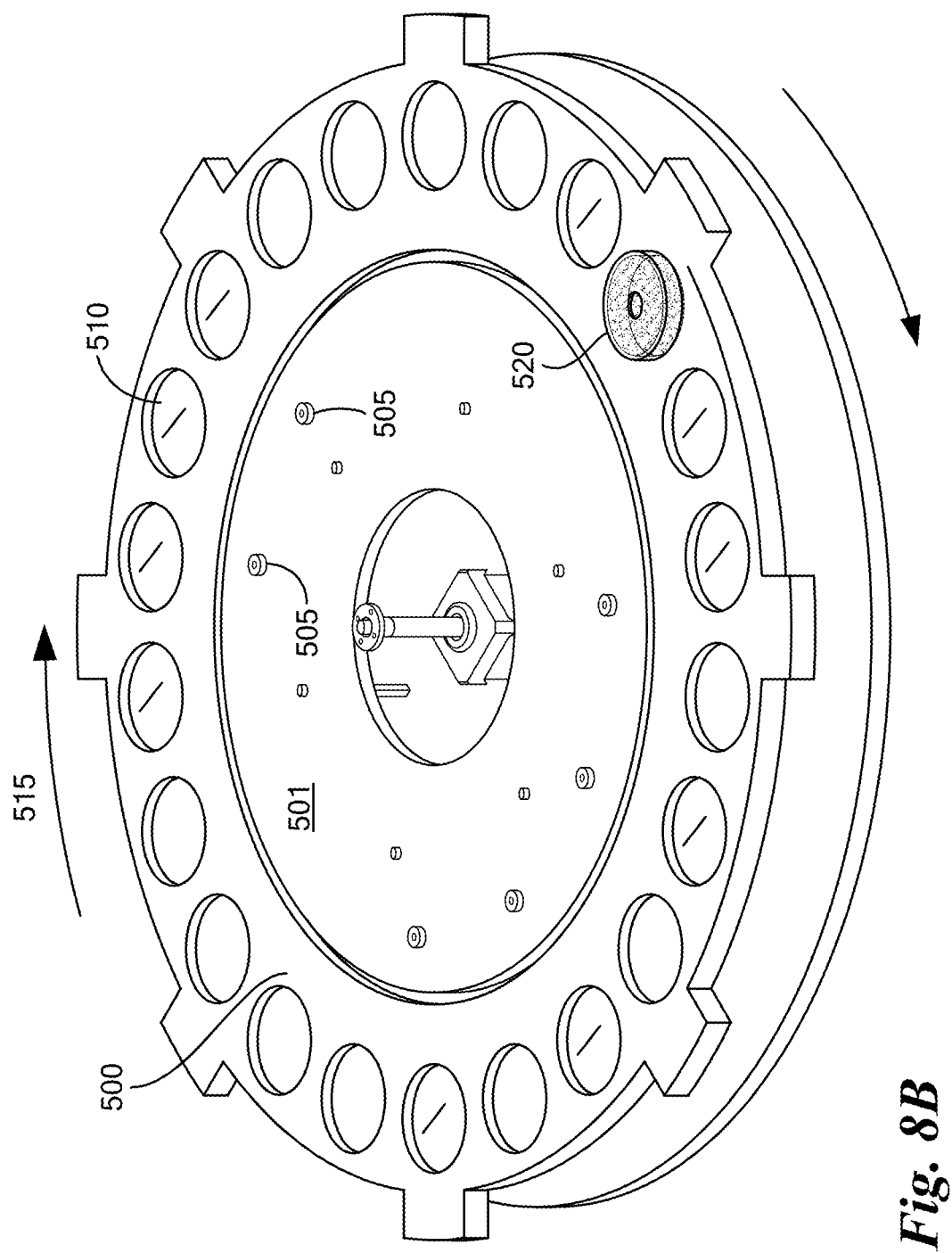
FIG. 8B shows a perspective view of an example rotation of a circular disc holder holding a sample disc suspected of containing microbial pathogens, with the circular disc holder surrounding a stationary inner plate including one or more cleaning vessels.

To illustrate the automated liquid handling, the example circular disc holder 500 shown in FIG. 8A, includes incrementally spaced sample disc holders 510 that can accept and securely hold sample discs (suspected of containing microbial pathogens on the detection surface) for automated liquid handling to perform the required fixation, labeling, and washing steps. After liquid handling or processing is complete on the detection surface of the discs, the sample holders easily release the sample discs, which are then taken to a detection system. FIG. 8B depicts the rotatable circular disc holder 500 with sample holders 510 surrounding a stationary inner plate 501. An example sample disc 520 on a sample disc holder rotates with the circular disc holder clockwise 515 or counterclockwise (not shown). One or more cleaning vessels 505 are provided for decontamination of the liquid handling dispensing/aspirating tubes.

Figure 8C:
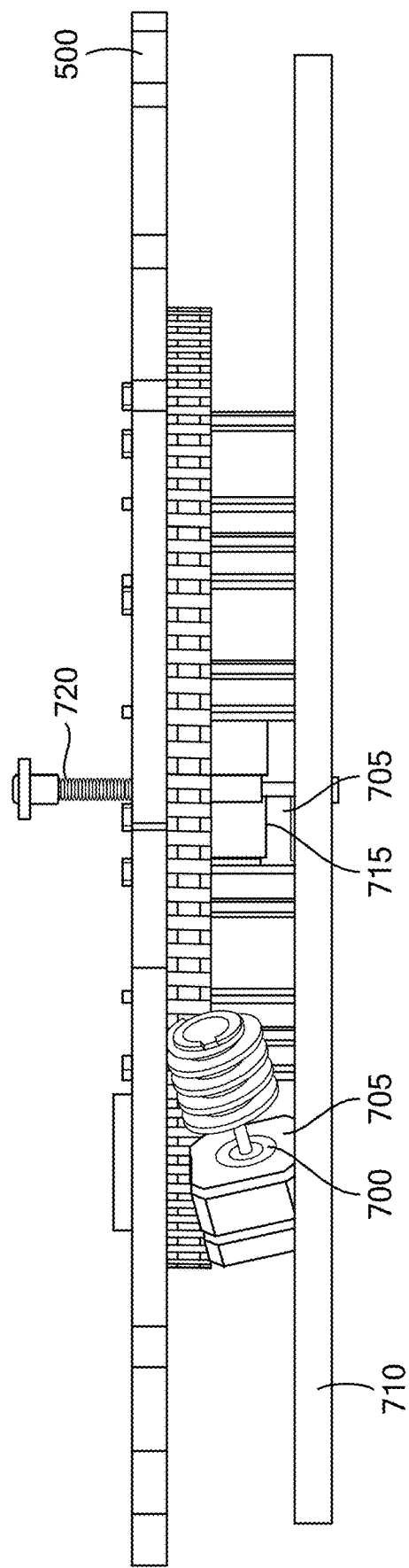
FIG. 8C shows a side view of a circular disc holder with a stepper drive mechanism and a sturdy base underneath. At center, a central motor with a lift shaft is depicted for attaching a top plate.

A side view of the rotatable circular disc holder 500 is shown in FIG. 8C, with a stepper motor 700 capable of incrementally moving the circular disc holder 500. A stationary base 710 provides mounting for the system. A central motor 715 is in connection with a lift shaft 720 for attachment of a top plate over the circular disc holder or sampler level. A control module 705 is configured to control, according to a program, incremental and intermittent rotation of the circular disc holder, and can be programmed to control functions, for example, when to actuate the central motor and other functions discussed below.

Figure 8D:
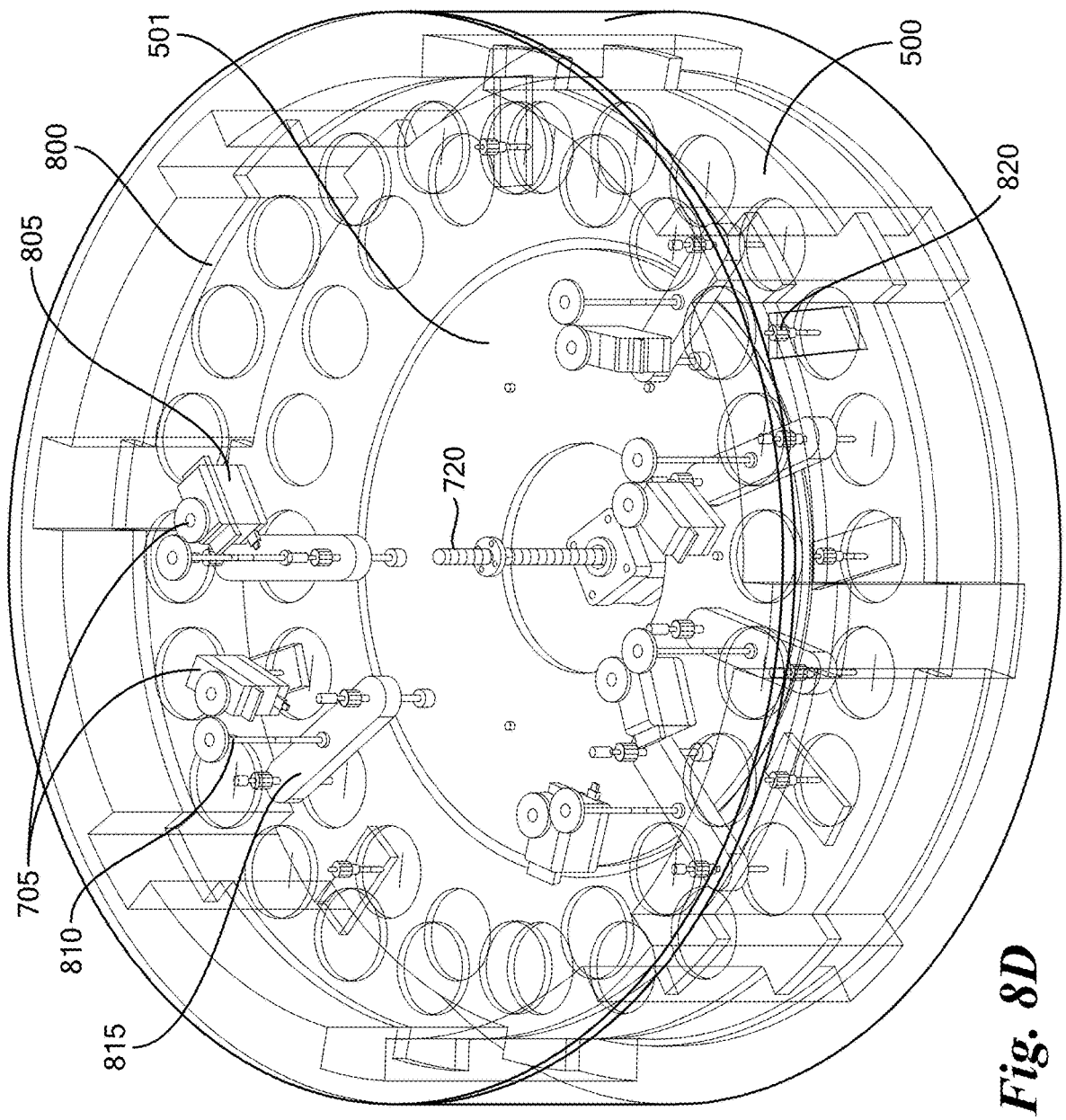
FIG. 8D shows a transparent view of a top plate positioned above a circular disc holder and stationary inner plate. The top plate includes actuators at top in connection with shafts penetrating through the top plate and two opposite arms connected to the bottom of each shaft.

The top plate is shown in the transparent view of FIG. 8D. The top plate 800 is in connection with the lift shaft 720 and capable of moving up or down under control of the control module 705 (FIG. 8C). The top plate is disposed over the stationary inner plate 501 and the circular disc holder 500. On top of the top plate are one or more actuators (or actuator motors) 805 in connection with one or more rotatable shafts 810. Below the top plate, connected to each are oppositely disposed arms 815, which are over the sampler level. The sampler level includes the stationary inner plate 501, the circular disc holder 500, and stationary reagent dispensing stations 820. The control module 705 is configured to, according to a program, actuate selected stationary reagent dispensing stations to dispense reagents, move the actuator motors, and other functions.

Figure 8E:
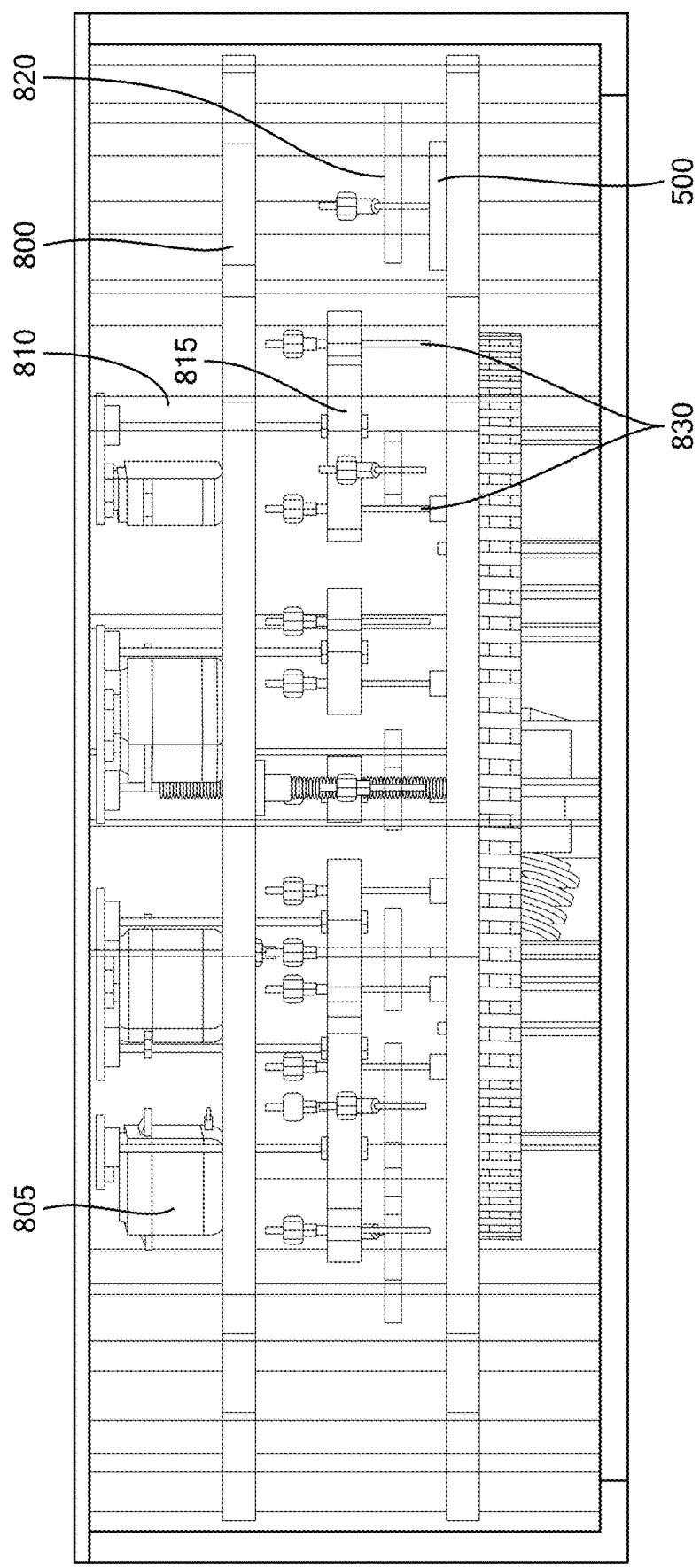
FIG. 8E shows a side view of a top plate positioned over a circular disc holder with actuators on the top plate in connection with shafts penetrating through the top plate and oppositely disposed arms at the bottom of each shaft. A stationary reagent dispensing station is shown just above the circular disc holder.
Figure 8F:
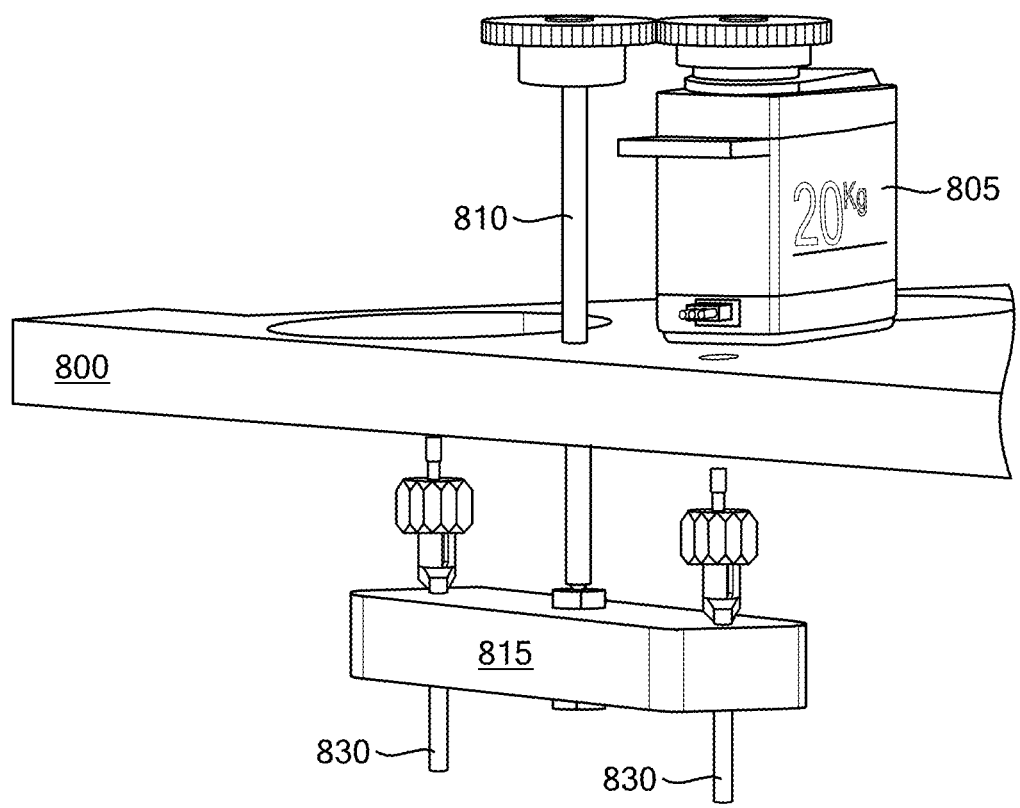
FIG. 8F shows a zoomed view of a top plate with an actuator in connection with a shaft and oppositely disposed arms at the bottom of the shaft. Each arm holds a dispensing/aspirating tube.
Figure 9A:
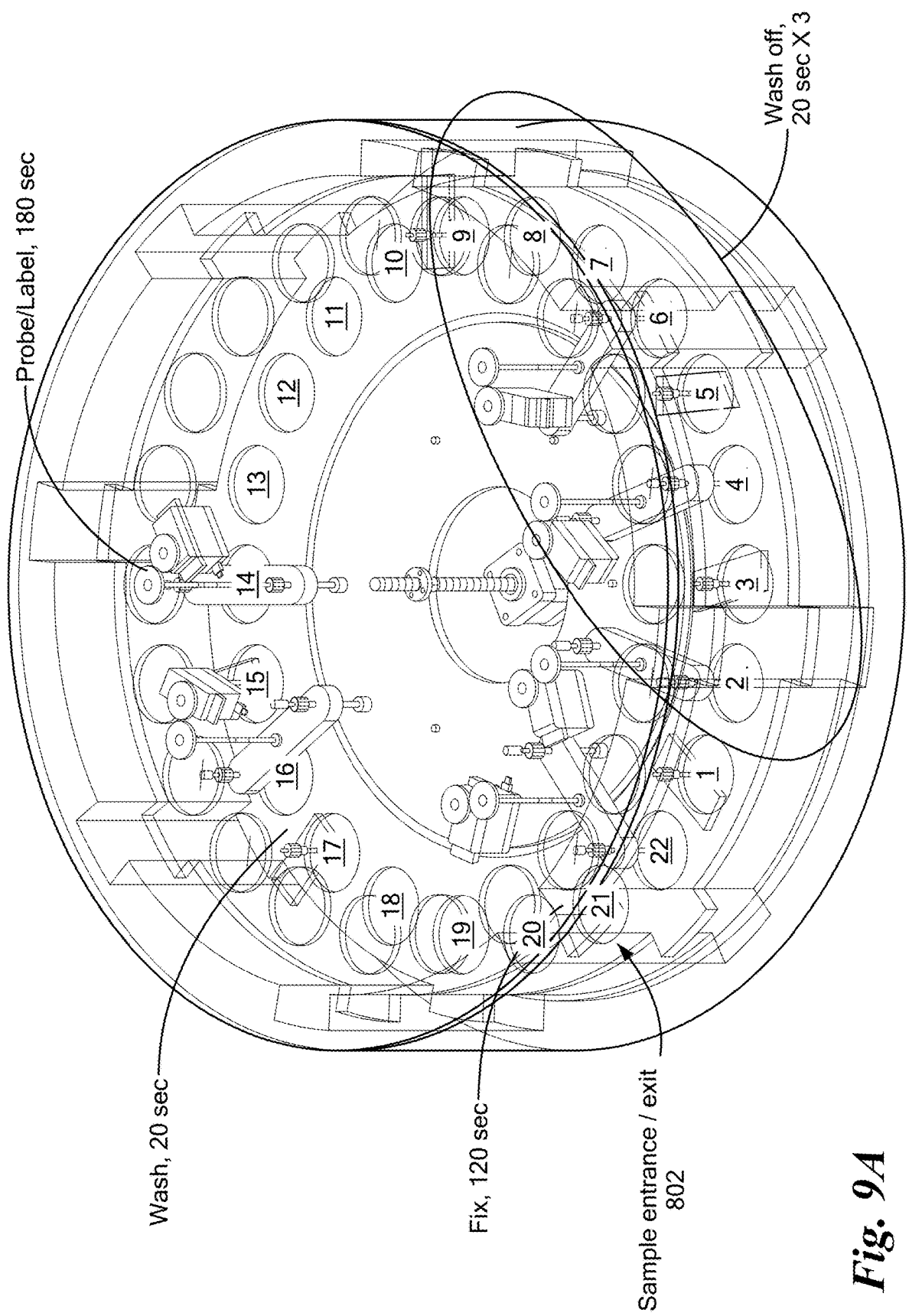
FIG. 9A shows an example transparent view of twenty-two processing positions for sample discs, with example time periods (in seconds) for various processing steps.
Figure 9B:
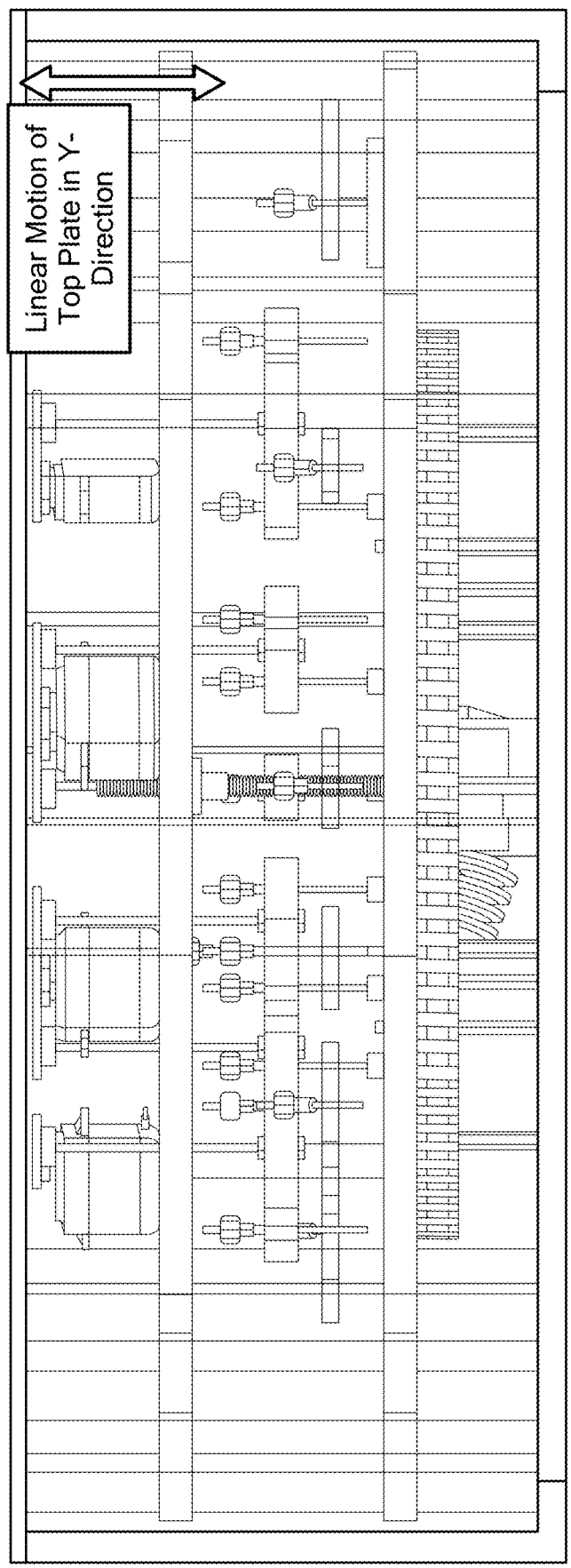
FIG. 9B shows an illustration of linear motion of the top plate.

A side view shown in FIG. 8E depicts a stationary reagent dispensing station 820 over the rotating circular disc holder 500. The top plate 800 has an actuator 805. Each actuator is in connection with a shaft 810 that penetrates through the top plate to connect with oppositely disposed arms 815. Each oppositely disposed arm provides a dispensing/aspirating tube 830 over the circular disc holder 500 or over a cleaning vessel 505 (FIG. 8B). The top plate can move up and down as depicted in FIG. 9B. When the top plate is in the down position, one dispensing/aspirating tube is in a cleaning vessel and the other is directly over a sample holder for an aspiration or dispensing. When the top plate is in the up position, the one tube that was in aspiration/dispensing position is rotated by the shaft and actuator to be over the cleaning vessel for decontamination. This feature provides for cleaning without a need to dispose of the dispensing/aspirating tube. The cleaning vessel can include a nichrome wire with electrical supply to achieve an internal temperature of about 125° C. For decontamination of a dispensing/aspirating tube of any suspected SARS-CoV-2, a temperature not less than about 90° C. is sufficient. The cleaning vessel can be heated using any suitable methods or materials. A closer view of an actuator 805, shaft 810, top plate 800, oppositely disposed arms 815, and dispensing/aspirating tubes 830 is shown in FIG. 8F.

Figure 8G:
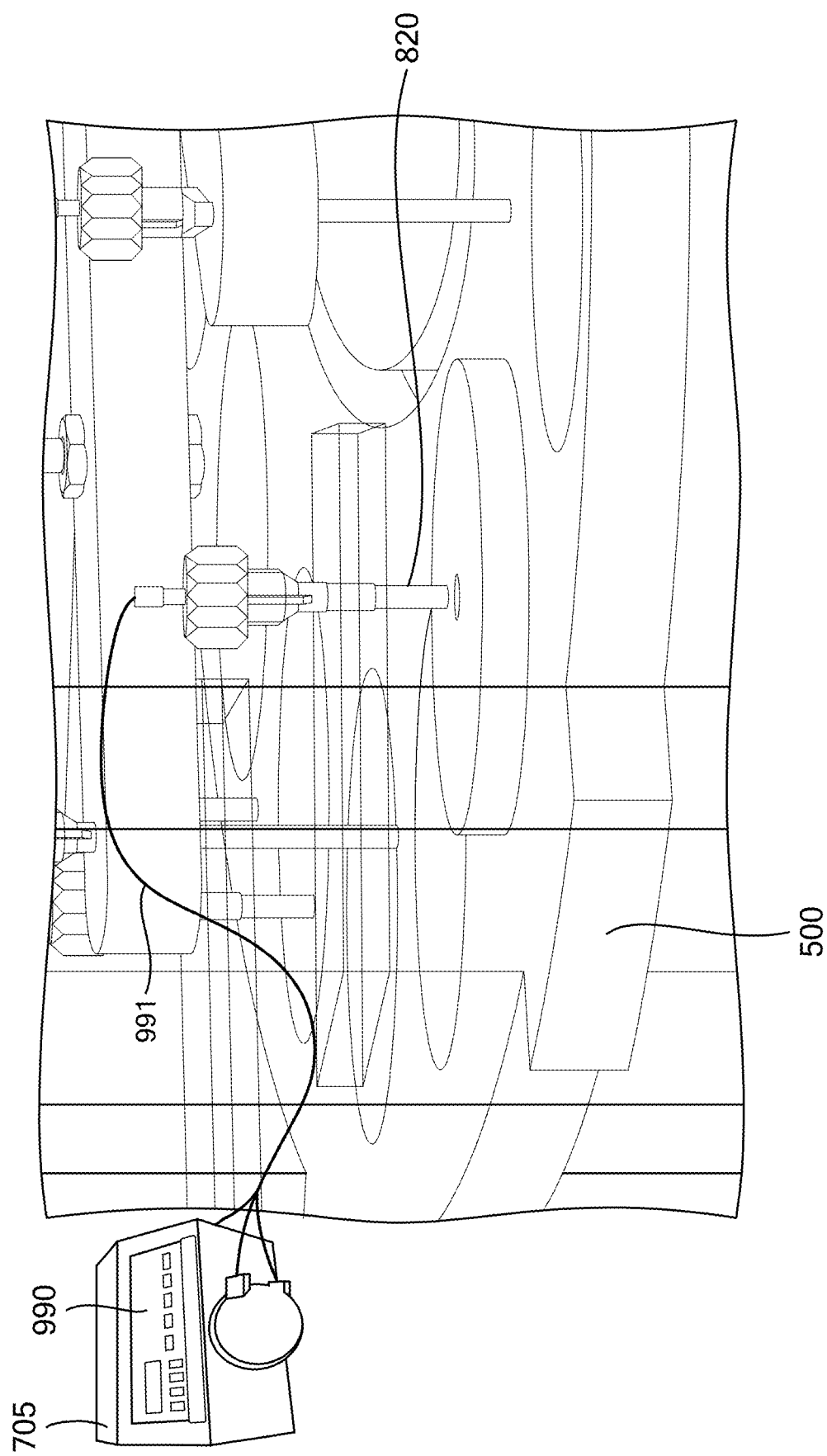
FIG. 8G shows a stationary reagent dispensing station with attached pump and tubing.
Figure 8I:
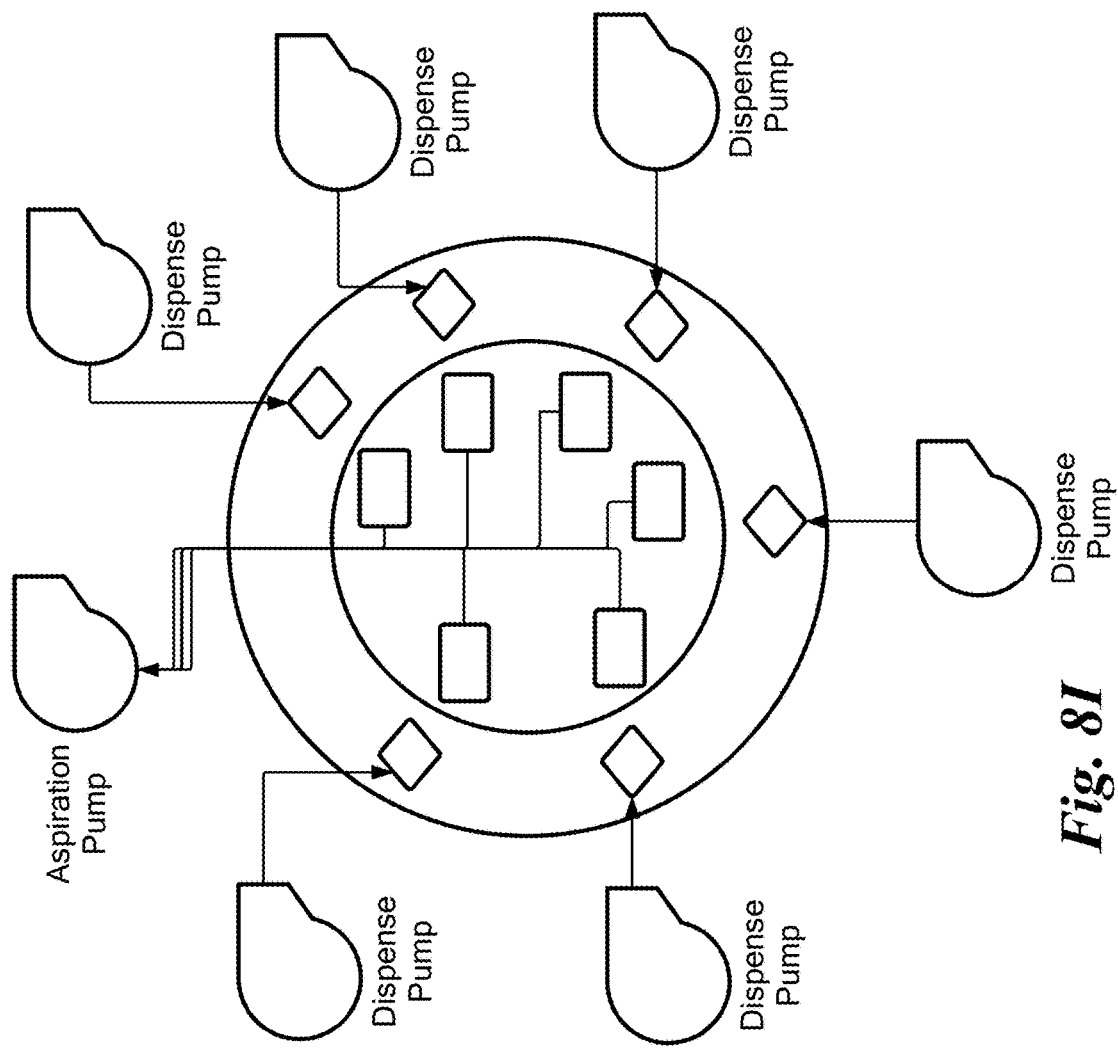
FIG. 8I shows an example schematic of liquid flow for a system for continuously fixating, washing, labelling, and re-washing of microbial pathogens disposed onto a plurality of detection surfaces of discs.
Figure 8H:
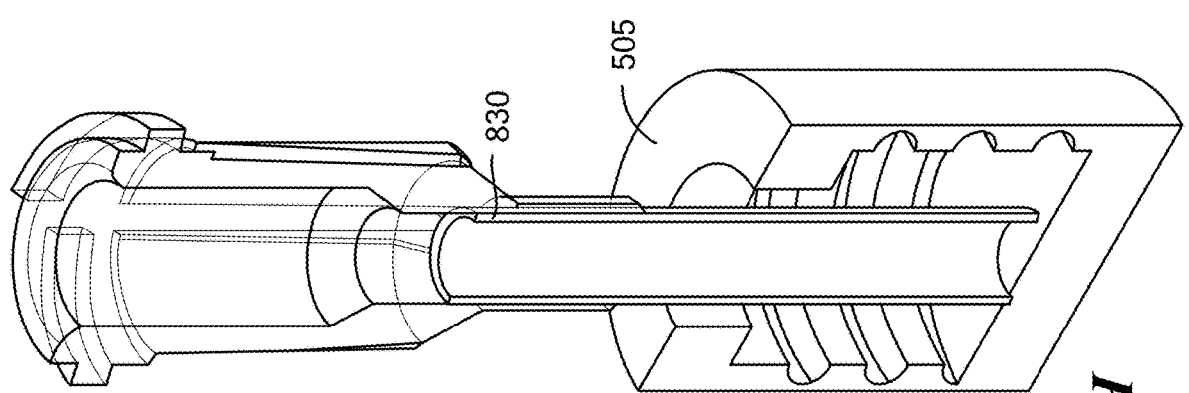
FIG. 8H shows a cutaway view of a dispensing/aspirating tube inserted into a cleaning vessel.

FIG. 8G provides a zoomed view of a stationary reagent dispensing station 820 over the circular disc holder 500 for dispensing a reagent onto a detection surface of a disc. A pump 990 with tubing 991 provide liquid flow to the stationary reagent dispensing station. The control module 705 is configured to, according to a program, actuate selected reagent dispensing stations. A view of a dispensing/aspirating tube 830 inserted into a cleaning vessel 505 is shown in FIG. 8H. Inside the cleaning vessel 505, the dispensing/aspirating tube 830 can be heated to a temperature great enough to destroy any potential microbial pathogens on the tube.

For fluidics of the system, various configurations are suitable. An example schematic of fluidics including six dispense pumps and an aspiration pump is depicted in FIG. 8I. Depending on the labeling assay used, different reagents can be provided for each pump or the same. The entire system can be flexibly adapted to automate different labeling methods.

The entire system can be incrementally timed to perform the example steps depicted in FIG. 7. In the example depicted in FIG. 9A there are twenty-two processing positions labeled in the system in a counter-clockwise manner. In FIG. 9A, the example of a sample entrance/exit 802 can be configured at any processing position. Each processing station is utilized to perform a reagent dispensing, an aspiration, or an incubation. A sample disc suspected of containing a microbial pathogen on the detection surface is placed at a starting processing position, and a liquid reagent (e.g., fixative) is dispensed onto the detection surface by a stationary reagent dispensing station. The top plate is lifted to an up position, the rotatable circular disc holder rotates, each of the dispensing/aspirating tubes that were utilized for dispensing or for aspiration rotate to a cleaning vessel position, and after about 20 seconds, the top plate is lowered to the down position, and excess reagent is aspirated from the detection surface. About every 20 seconds, the rotatable circular disc holder incrementally rotates about 16.36 rotational degrees clockwise. After 120 seconds of fixation, the sample that was originally placed at a starting processing station arrives at processing station for a 20 second wash. Excess wash is aspirated at an aspiration station. A labeling or probing reagent is applied at another processing station. Excess labeling or probing reagent is aspirated at an aspiration station. After about 180 seconds, the sample is at a wash position to wash off any excess labeling or probing solution. A wash solution can be applied at any of the positions, depending upon the configuration. Excess wash can be aspirated by utilization of the dispensing/aspirating tubes. Repeated washing can be accomplished. The sample disc can be removed from the circular disc holder at any processing position. After the sample moves from the starting processing position, additional sample discs for liquid handling can be added to the circular disc holder for a continuous processing of sample discs and/or detection surfaces. In various configurations, to carry out liquid handling methods, the circular disc holder can rotate in a counterclockwise direction, a clockwise direction, or can alternate directions depending upon the program and desired method processing steps.

The automated fluid handling system can be utilized to carry out the following example method: for initial fixation, about 200 µL can be dispensed, incubate for about 2 minutes, and aspirate residual fluid withing about 5% allowable excess. For first wash, about 200 µL can be dispensed, incubate for about 20 seconds, and aspirate residual fluid withing about 5% allowable excess. For probing or labeling, about 500 µL can be dispensed, incubate for about 3 minutes, and aspirate residual fluid withing about 5% allowable excess. For triple wash, about 200 µL can be dispensed, incubate for about 20 seconds, and aspirate residual fluid withing about 5% allowable excess.

The labeling reagent can include two color, dual-antibody labels specific for the microbial pathogen in question and which produces optimal conditions for binding to the virus. Antibody labelling has high specificity, high affinity, and rapid development post-onset of a pandemic. Some of the first tests for the current SARS-CoV-2 pandemic were antigen tests (CDC guidance) and antibody development and design were quickly undertaken by the scientific community at large once the structure of the virus was known (Chen, et al., 2020). Human monoclonal antibodies to SARS-CoV-2 spike protein were reported as early as April 2020 (Huang, et al., 2020) and their development has continued such that there is now a myriad of them available for general sale and as approved treatment for SARS-CoV-2 (FDA issued Regeneron EUA Nov. 21, 2020). A critical assumption of this approach is that there will always be antibodies or virus binding analogs (e.g., engineered nanobodies) available with high affinity, high-specificity and relatively low-cost in the wake of a pandemic. There is no reason to doubt that this will not be the case going forward given the robust global biotechnology industry. Once labelled microbial pathogens have reached the exit of the system, after they have interacted with the labels under optimal binding conditions, the detection surface of the disc is ready for scanning.

Figure 9C:
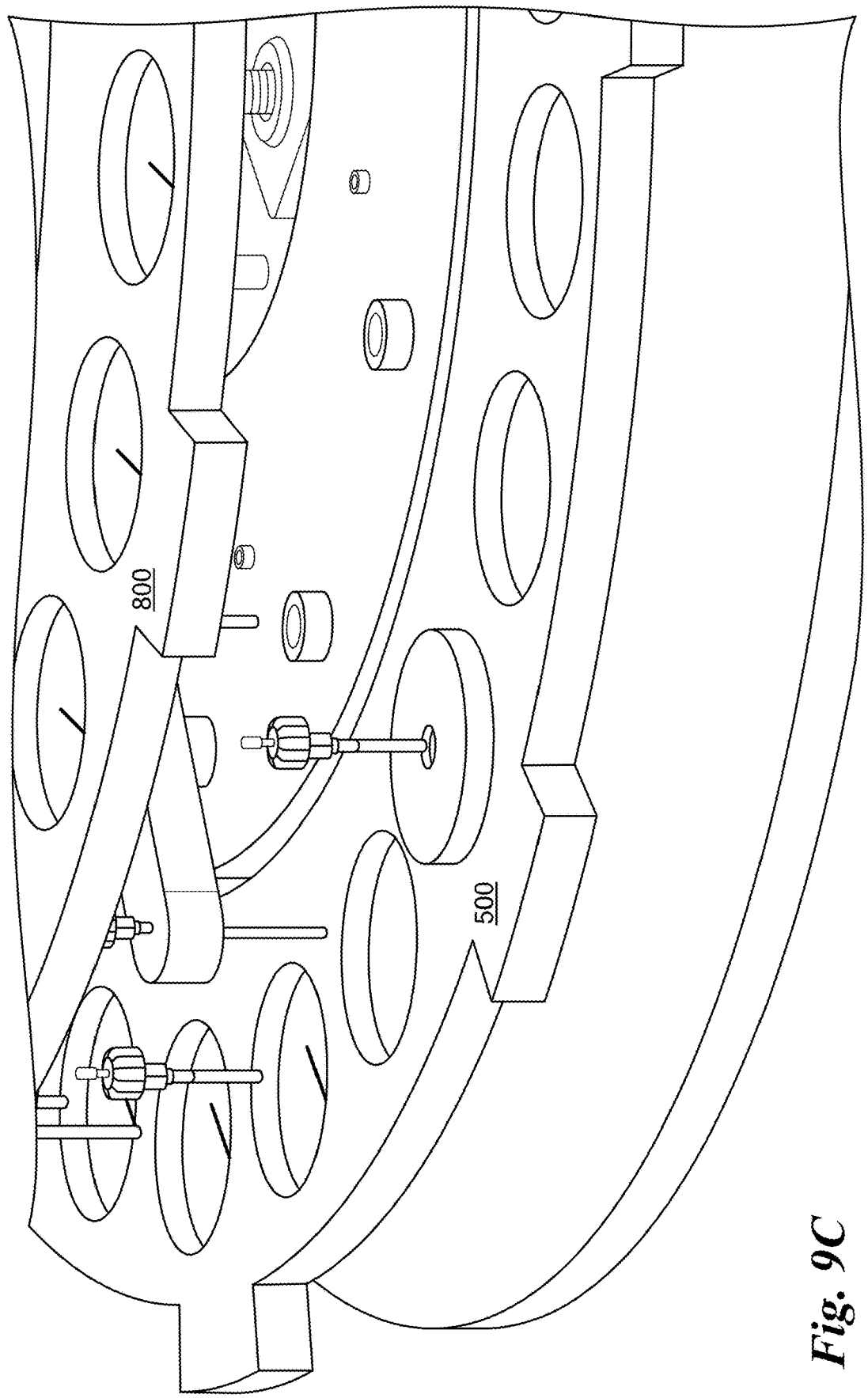
FIG. 9C shows the top plate in an up position.
Figure 9D:
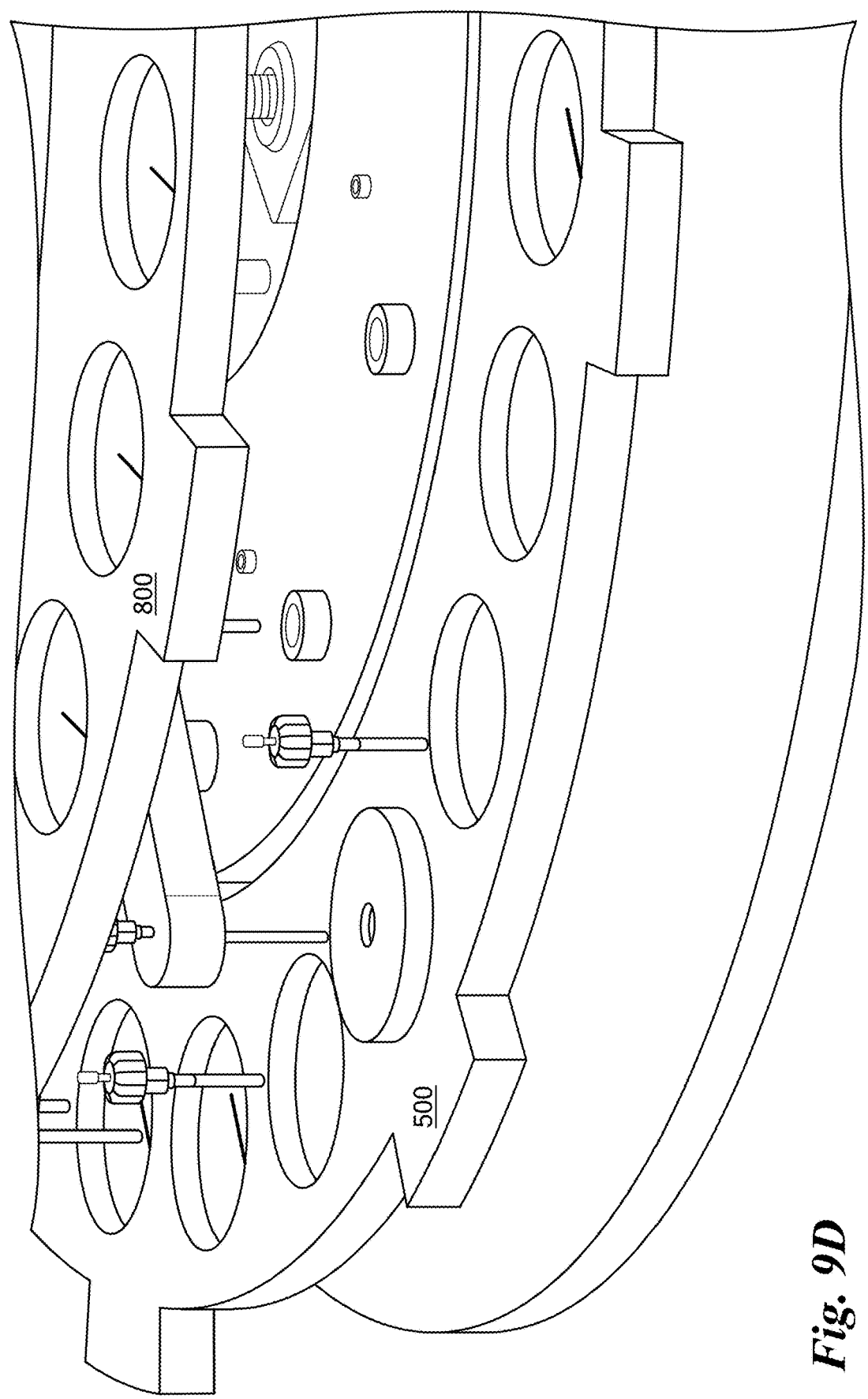
FIG. 9D shows the rotation of the circular disc holder rotating in in incremental rotation, compared to FIG. 9C (and the top plate remains in the up position).
Figure 9E:
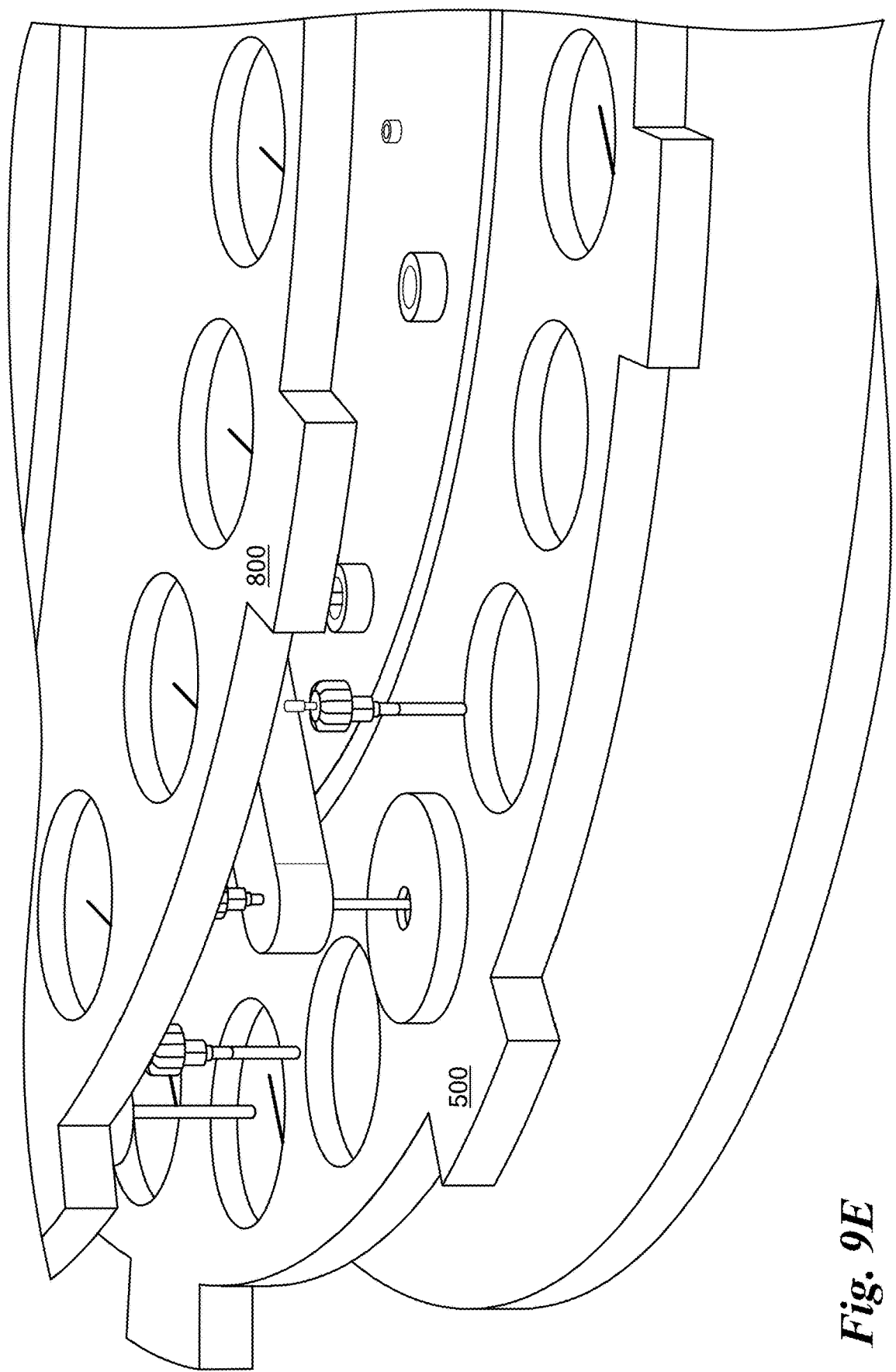
FIG. 9E shows the top plate moved to the down position compared to FIG. 9D.
Figure 9F:
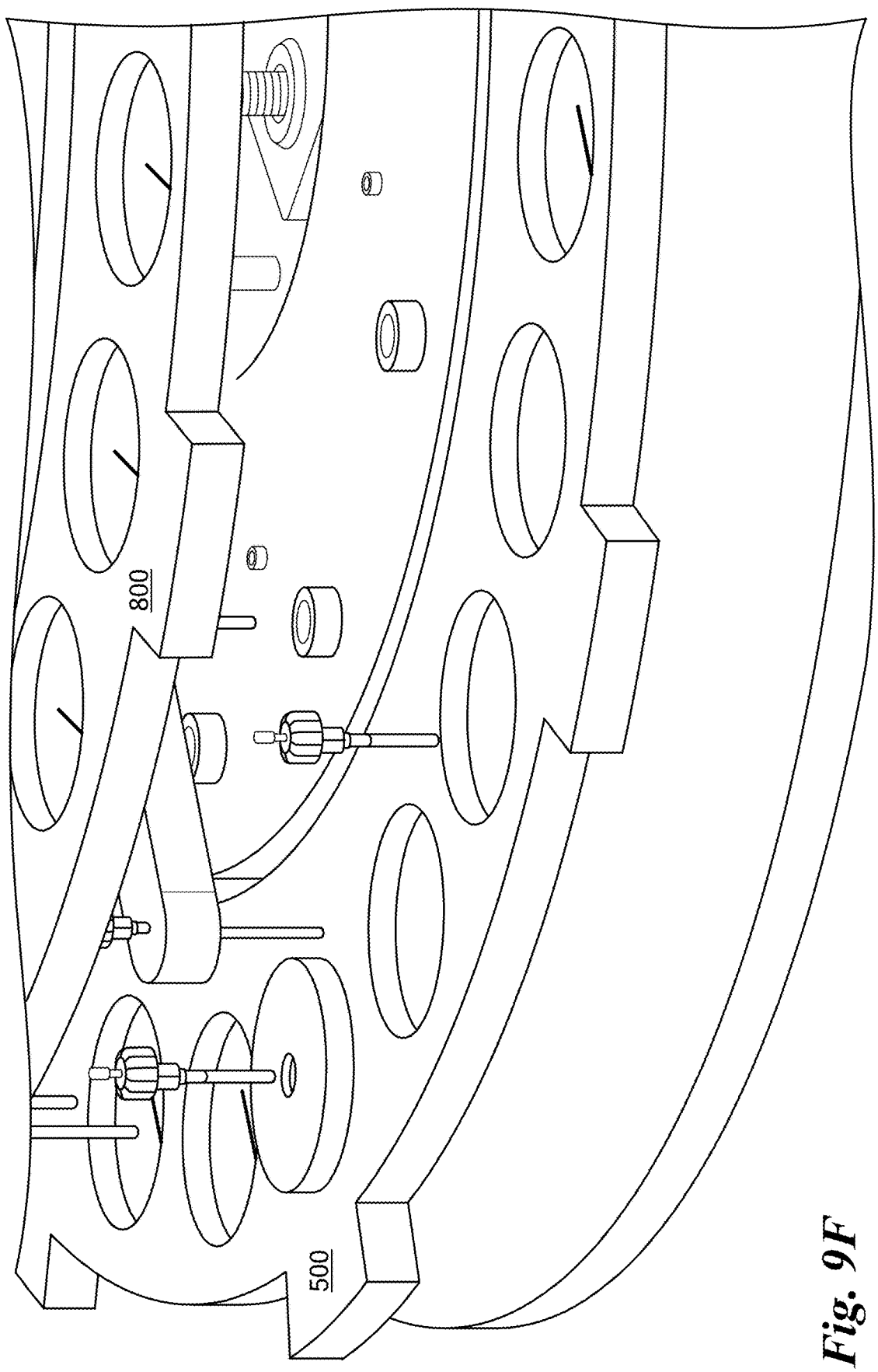
FIG. 9F shows the circular disc holder after an incremental rotation compared to FIG. 9E (top plate returned to the up position).

To further illustrate the automated liquid handling system, in FIG. 9C, the top plate 800 is depicted in the up position with an example of a sample and a position of the circular disc holder 500 under a stationary reagent dispensing station. FIG. 9D shows the rotation of the circular disc holder 500 rotating in in incremental rotation, compared to FIG. 9C (and the top plate 800 still in the up position). FIG. 9E shows the top plate 800 moved to the down position compared to FIG. 9D. FIG. 9F shows the circular disc holder 500 after an incremental rotation compared to FIG. 9E (top plate 800 returned to the up position). In FIGS. 9C-9F, the tubes that appear to be unsupported by structures are held by structures, but the structures have been made transparent in these figures to illustrate the capabilities of the system.

In the example above, after a sample disc is removed from the circular disc holder, any targeted microbial pathogens on the detection surface of the disc will be specifically labeled. Excess labeling solution will be washed off. The surface is ready for detection. An optional drying step after the liquid handling can be included in the system or done outside the system.

Figure 10:
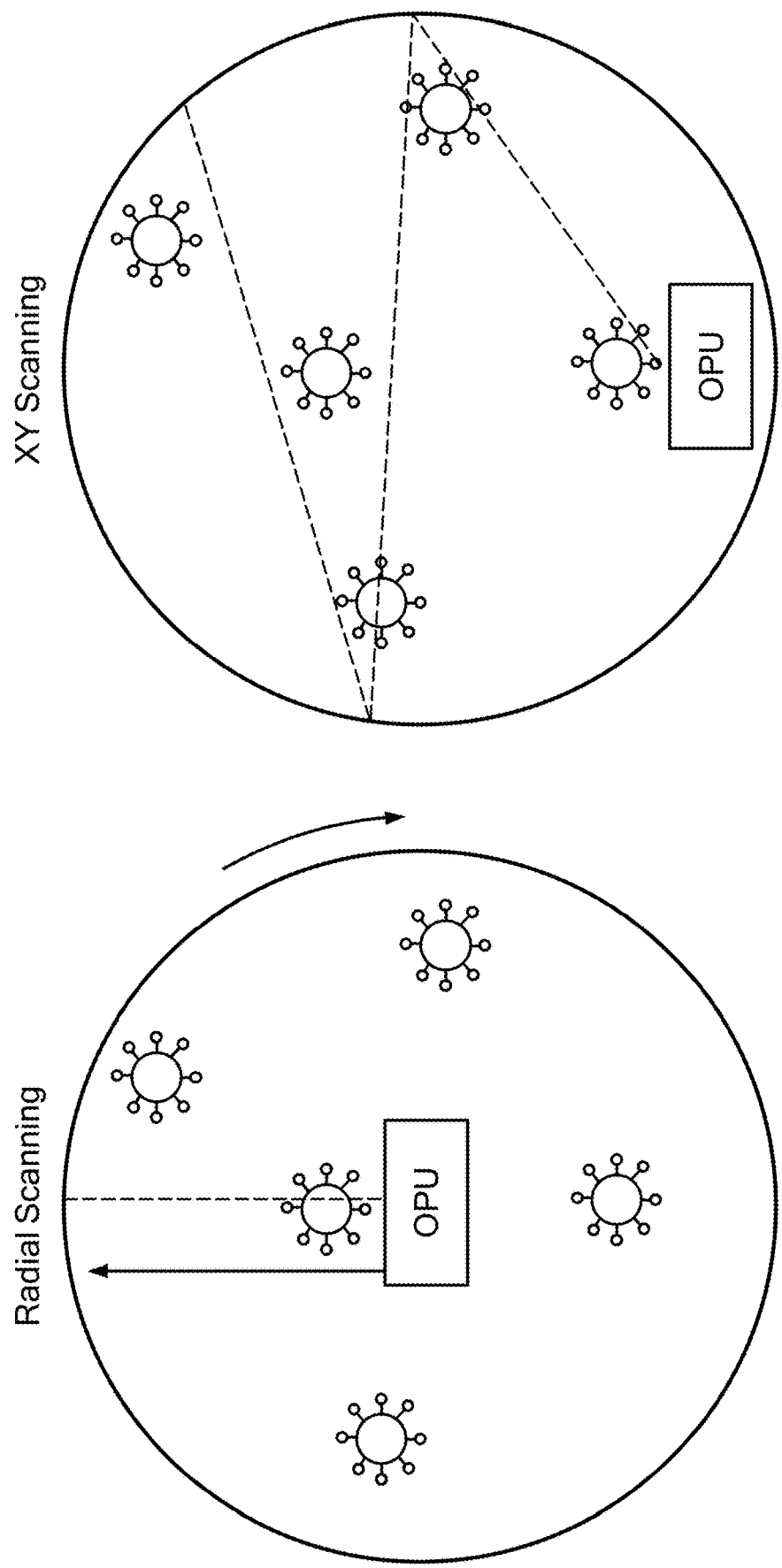
FIG. 10 shows a comparison of radial detection scanning (left) to XY detection surface scanning (right).

For accurately scanning for labeled microorganisms on the detection surface of the disc, scanning an entire collection zone (or scanning zone) shown in FIG. 3 should be done over the entire zone. A scanning zone can have a different shape or size so long as the label microorganisms of interest are in the scanning zone. In the example of a circular collection zone, FIG. 10 depicts a comparison between radial scanning (left) and XY scanning (right) of a detection surface of a disc including labeled microbial pathogens. A radial scanning is made most efficient by rapidly rotating the detection surface of the disc and moving the spot or position of scanning along a radial line emanating from the center (OPU at left of FIG. 10) to the edge. The entire collection zone can be scanned. The time of the linear traverse and actual rotational speed necessary to scan the collection zone, readable by detection is optimized.

Figure 11A:
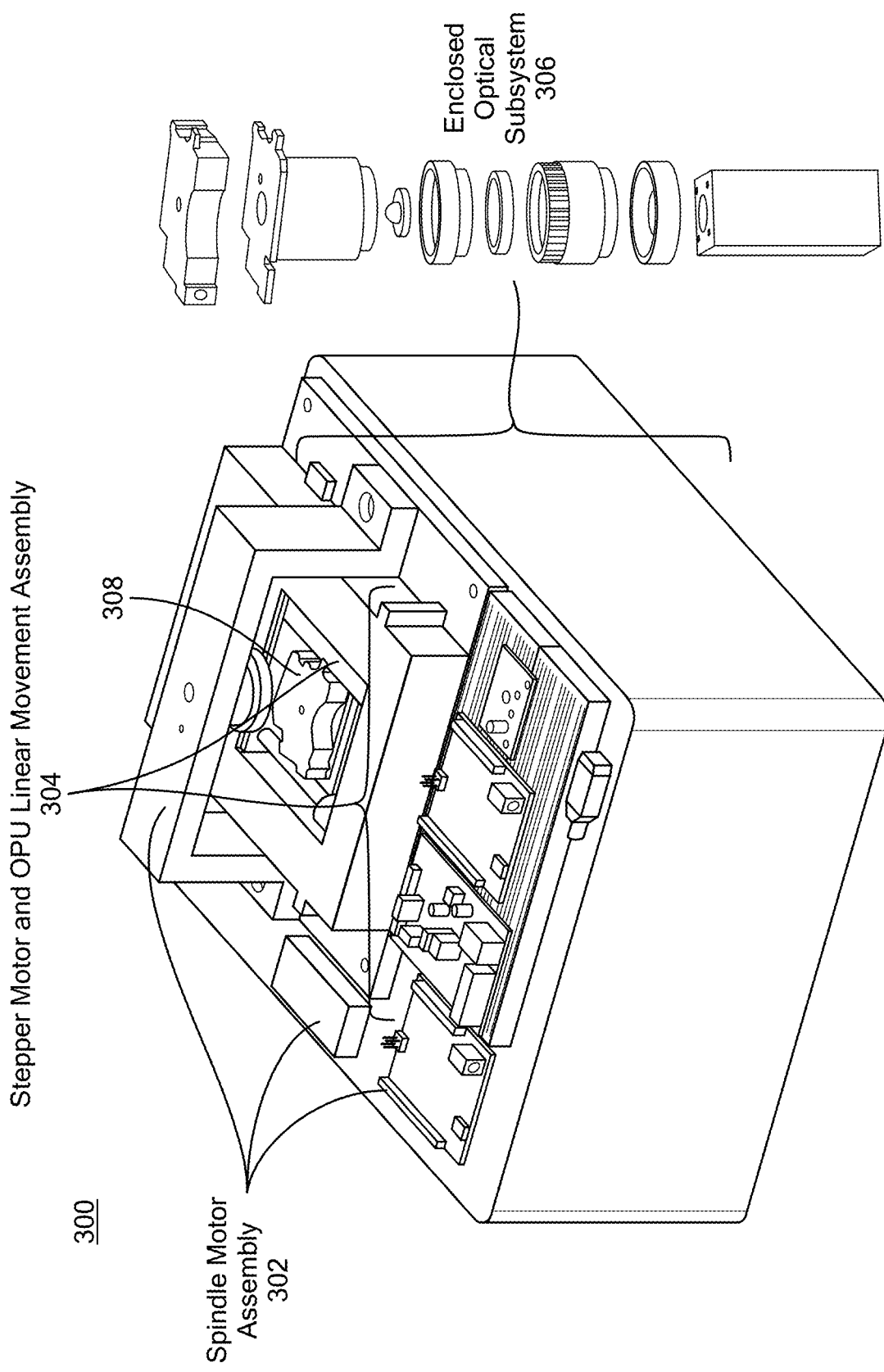
FIG. 11A shows a system for automated detection of a labeled microbial pathogen on a detection surface of a disc with a detector including a spindle motor assembly, an optical pickup unit (OPU) with enclosed optical system shown at right.

A system for automated detection of a labeled microbial pathogen on a detection surface of a disc is depicted in FIG. 11A. An optical OPU 308 is designed with a custom enclosed optical subsystem 306 shown at right. A spindle motor assembly 302 provides spinning of a detection surface of a disc for scanning. The OPU transmits a laser upwards in this design.

Figure 11B:
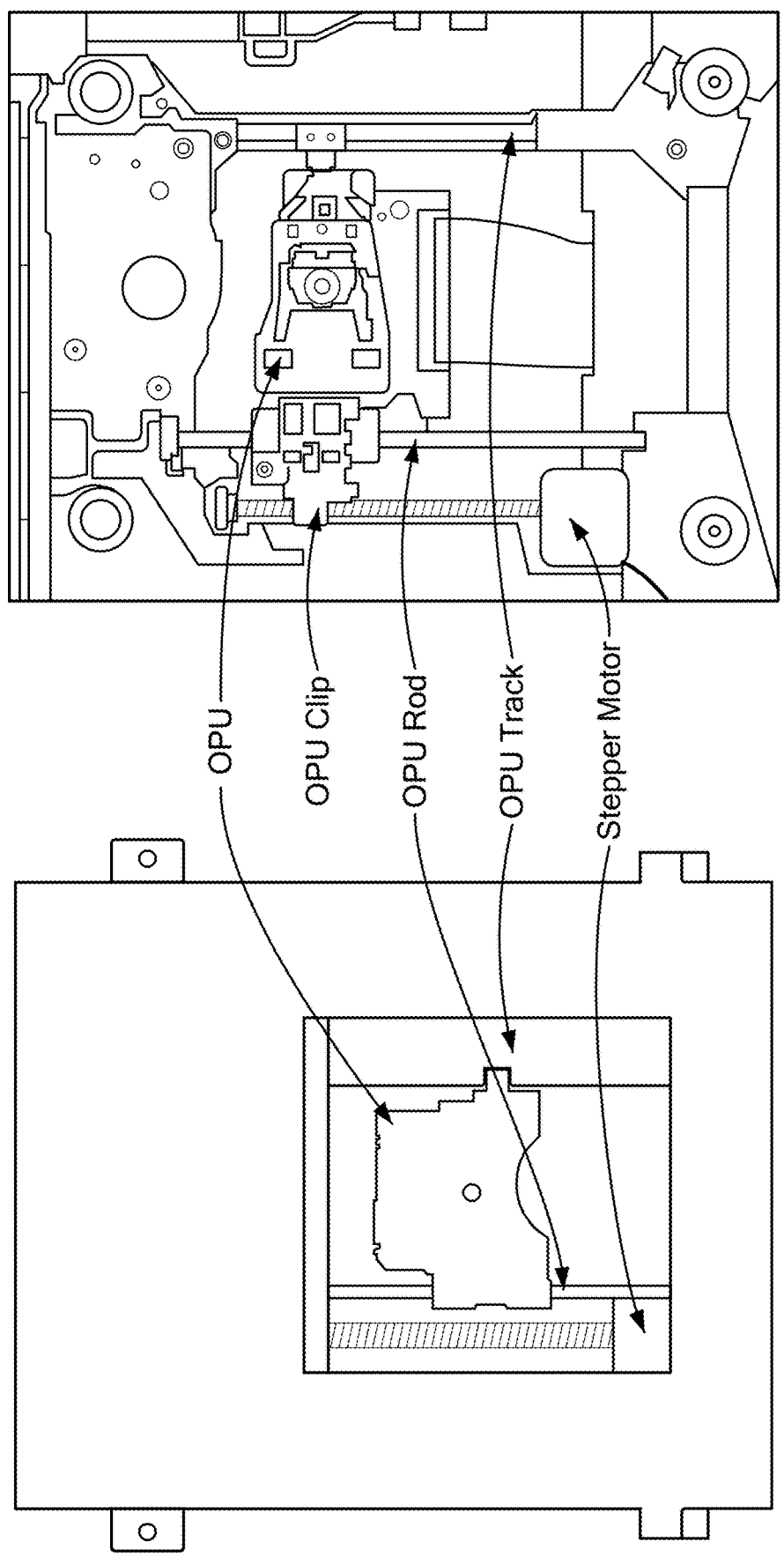
FIG. 11B shows photos of a top view (left) of an OPU and a bottom view (right) of an OPU without the enclosed optical subsystem.
Figure 11C:
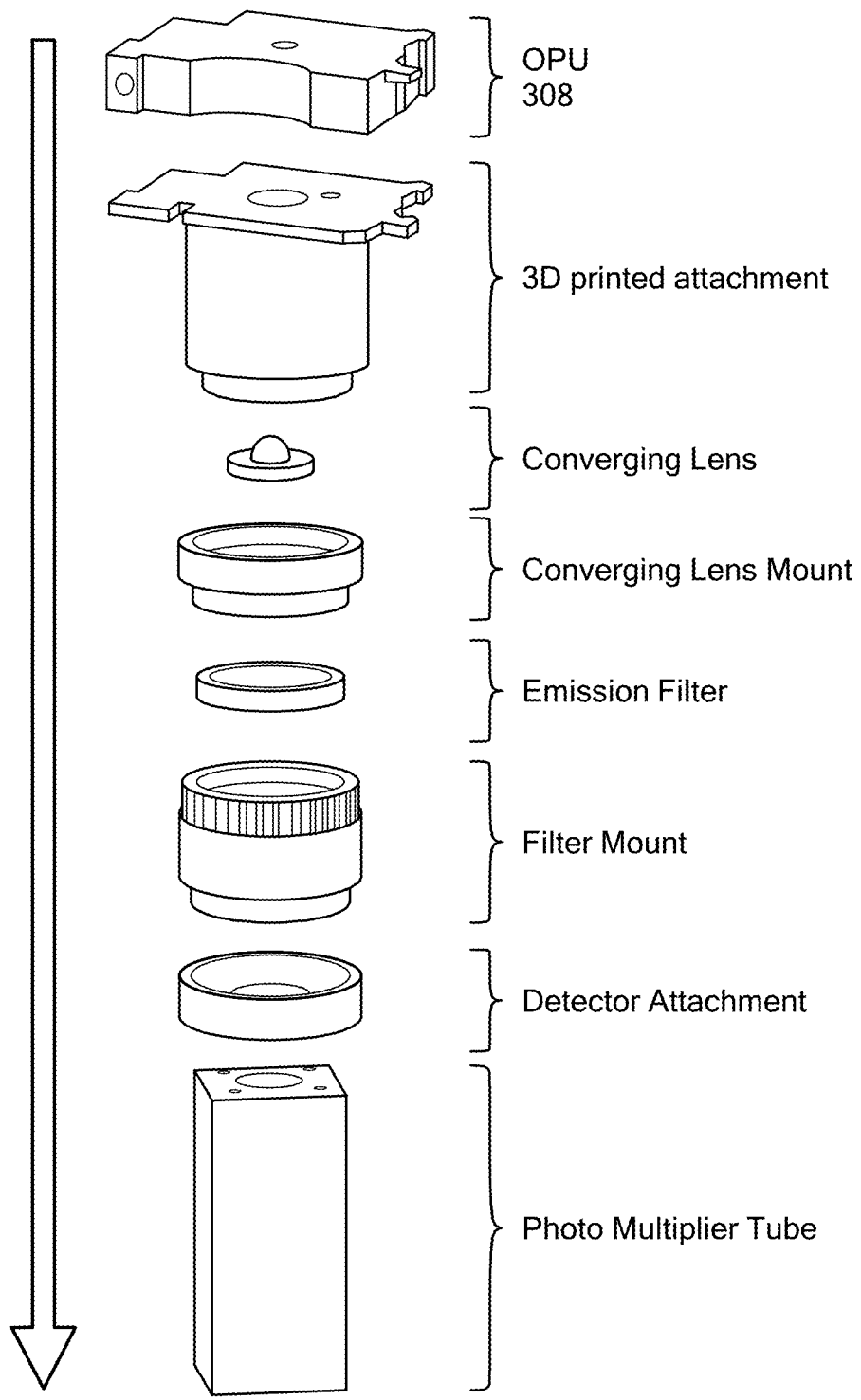
FIG. 11C shows components of the enclosed optical subsystem below the OPU in FIG. 11A.

The OPU 308 depicted in FIG. 11A is a modified Blu-Ray OPU engineered with the enclosed optical subsystem 306 shown at right. Calculations show that the illumination intensity for Blu-Ray at 405 nm is ~$10^8$ mW/mm$^2$ on a spot size of about 150 nm. Given the numerical aperture of the Blu-Ray system (0.8) and the modifications herein (addition of a dichroic mirror, barrier filter and fast, sensitive PMT) the total optical efficiency is about 2.3%. Given a bright fluorophore (e.g., Brilliant Violet 421) the total number of photons that can be collected in about 100 nanoseconds is ~268. With the surface rotating at a constant speed of 4000 RPM, and the OPU traversing the disk linearly at a constant speed, the amount of photons collected in the center of the surface will be more than at any r distance away from the center (because linear speed increases the farther away you get from the center). At the outer edge of the surface/collection zone, the OPU+detection system will be sitting at any one spot for about 100 nanoseconds. With this particular fluorophore, 100 nanoseconds is enough time to collect ~268 photons. Calculations show that it is possible to collect fluorescence even at the shortest possible exposure time (the outer edge of the collection zone). While there are likely detectors that can capture on that time scale, fluorophore fall times are potentially longer than the traverse time. Thus, it is required to optimize the rotational velocity for concentrating and detecting the SARS-CoV-2 virus, separately. FIG. 11B shows photos of a top view (left) of an OPU without the enclosed optical subsystem and a second top view (right) of an OPU without the enclosed optical subsystem 306. The stepper motor is capable of moving the OPU with the enclosed optical subsystem over the entire scanning zone or collection zone while the detection surface of the disc to be scanned rotates. To control the movement of the stepper motor, a Red Board is programmed to $16^{th}$ microstep mode to enable the smallest stepping capability of a Big Easy Driver. The number of steps forward and backwards is set in the program, and the delay in milliseconds between each step corresponds to the speed of the stepper motor. Because the spindle motor will be moving at about 4000 RPM, or 66.66 RPS, the stepper motor must make a microstep every 15 ms to change the position of the OPU for every rotation of the sample detection surface.

The components of the optical subsystem 306 are shown in FIG. 11C. A custom dichroic filter (not shown) replaces a mirror within the OPU. Within the OPU, the 405 nm laser passes through a mirror when exiting the OPU and when returning to the position detector integrated circuit. To transmit the fluorescence light emitted by the excited fluorophores into the photo multiplier tube, this mirror needs to be replaced with a dichroic long pass filter with a transmission wavelength of 470-1600 nm and a reflection wavelength of 350 nm-430 nm. A custom ordered 4.5×4.2×1.05 mm filter of these properties is utilized. The mirror is securely glued with 27B UV light glue in the same spot where the OPU's original mirror was.

A spindle motor from a Blu-ray player is modified to hold a detection surface of a disc for analysis. FIG. 12A shows an enlarged view of a spindle motor and spindle motor assembly for a system for automated detection of a labeled microbial pathogen on a detection surface of a disc. A detection surface of a disc 301 with a labeled microbial pathogen is scanned by directing a laser upwards from the OPU 308. Labeled microbial pathogens fluoresce at the top of the detection surface of a disc 301 and emission is transmitted back down to the OPU 308. A reflective strip, area, or partial coating is at detection surface of the disc 301 for an autofocus function of the OPU. An enclosure around the detection system is required. FIG. 12B shows a photo of an example enclosure for subcomponents of a system depicted in FIG. 12A. A photo of a system for automated detection of a labeled microbial pathogen on a detection surface of a disc on top of the enclosure is provided in FIG. 12C.

To improve the accuracy and speed of virus detection, a machine-learning based analysis can be performed on the fluorescence dataset to robustly identify the existence of coronavirus in the collection zone or scanning zone. The goal of the developed computational algorithm is an optimized search protocol for the presence of virus. Because it is anticipated that most of the detection surface of a disc to be scanned will usually be negative, the objective focuses on how to determine whether a negative reading is present as fast as possible. To meet this goal, one way is to establish an optimization problem of simultaneously minimizing scanning time as well as the uncertainty of the given sample being negative. This can be achieved by developing a machine-learning based search algorithm that will prioritize certain locations to be scanned (Fukami, et al., 2020). Probabilistic neural network approaches can also be incorporated to assess the level of uncertainty of the measure as the scan is performed (Maulik, et al., 2020). Once the level of uncertainty in the diagnosis reaches a set threshold, there is the ability to terminate the scanning operation, achieving significant reduction in the overall time required to reach a diagnosis. The present approach can be tested rigorously and assessed carefully with a large number of test data sets.

The detection technology exhibits an accuracy of detection of at least 95% without the data analysis above. The automated detection system can scan a detection surface area of about 0.8 $cm^2$ in less than five minutes with such accuracy. Instead of traditional widefield microscopy, the system utilizes a Blu-ray laser-based fluorescence detection system that is modified. The Blu-ray laser fluorescence detection system is automated, highly accurate, and much cheaper than traditional widefield microscopy; additionally, the autofocus function keeps the correct z-plane in focus at all times. The system uses a different diagnostic method than conventional rt-qPCR. In theory Turbo FISH can detect a single RNA molecule and has the potential to be much more sensitive than a PCR detection method. Automating the liquid handling and the detection system makes it viable for widespread diagnostic use.

The detection system and the automated liquid handling system disclosed herein can be deployed without involving a trained lab technician. Point of care (POC) settings can be enabled to test for a variety of microbial pathogens.

Almost any sampling technique that can collect a sample on a detection surface of a disc can be utilized. Examples of TurboFISH are found in U.S. Patent Application Publication US 2016/0258005 A1.

The systems disclosed herein have been designed to meet the need for rapid, inexpensive point-of-care testing during the COVID-19 pandemic. The systems can be adapted to detect any respiratory virus by using different probes to conjugate to the viral RNA. The laser scanning can be beneficial in other fluorescence microscopy applications, given its accuracy and autofocus function.

EXAMPLES

Example 1: Fluid Processing Device

To perform a microbial pathogen detection assay in a POC setting, a fully automated processing system was provided to accurately dispense, incubate, and aspirate needed reagents onto collected patient samples to prepare them for fluorescence detection by Turbo FISH or by fluorescently tagged antibodies. An exemplary device is shown in FIG. 8D.

The samples move through the device in a serialized manner to decrease processing time. The device employs a circular disc holder that brings samples sequentially to processing stations where they receive reagents delivered with peristaltic pumps and reusable syringe tips. The processing stations are spaced to allow for adequate incubation time at each step, while aiming to decrease total process time per sample. A vigorous decontamination process of the dispensing/aspirating tubes can be performed with heated elements or vessels to prevent cross contamination and false positive results. Each dispensing/aspirating tube can be used for an aspiration while the opposing dispensing/aspirating tube is heated for decontamination of microbial pathogens. The configuration did not require consumable pipette tips for processing of the sample detection surfaces of multiple discs.

Example 2: Automated Detection Device

Figure 12A:
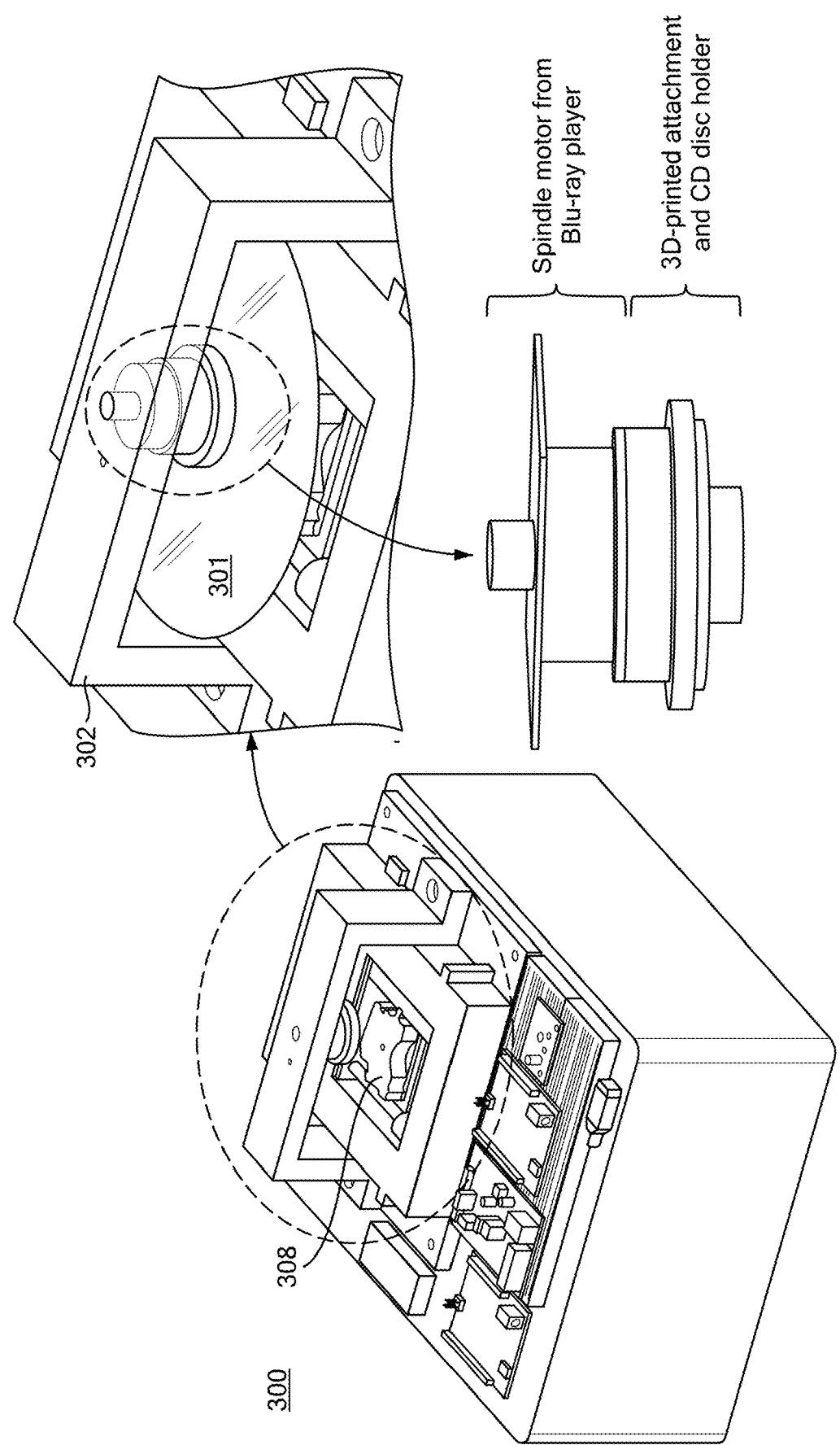
FIG. 12A shows an enlarged view of a spindle motor and spindle motor assembly for a system for automated detection of a labeled microbial pathogen on a detection surface of a disc.
Figure 12B:
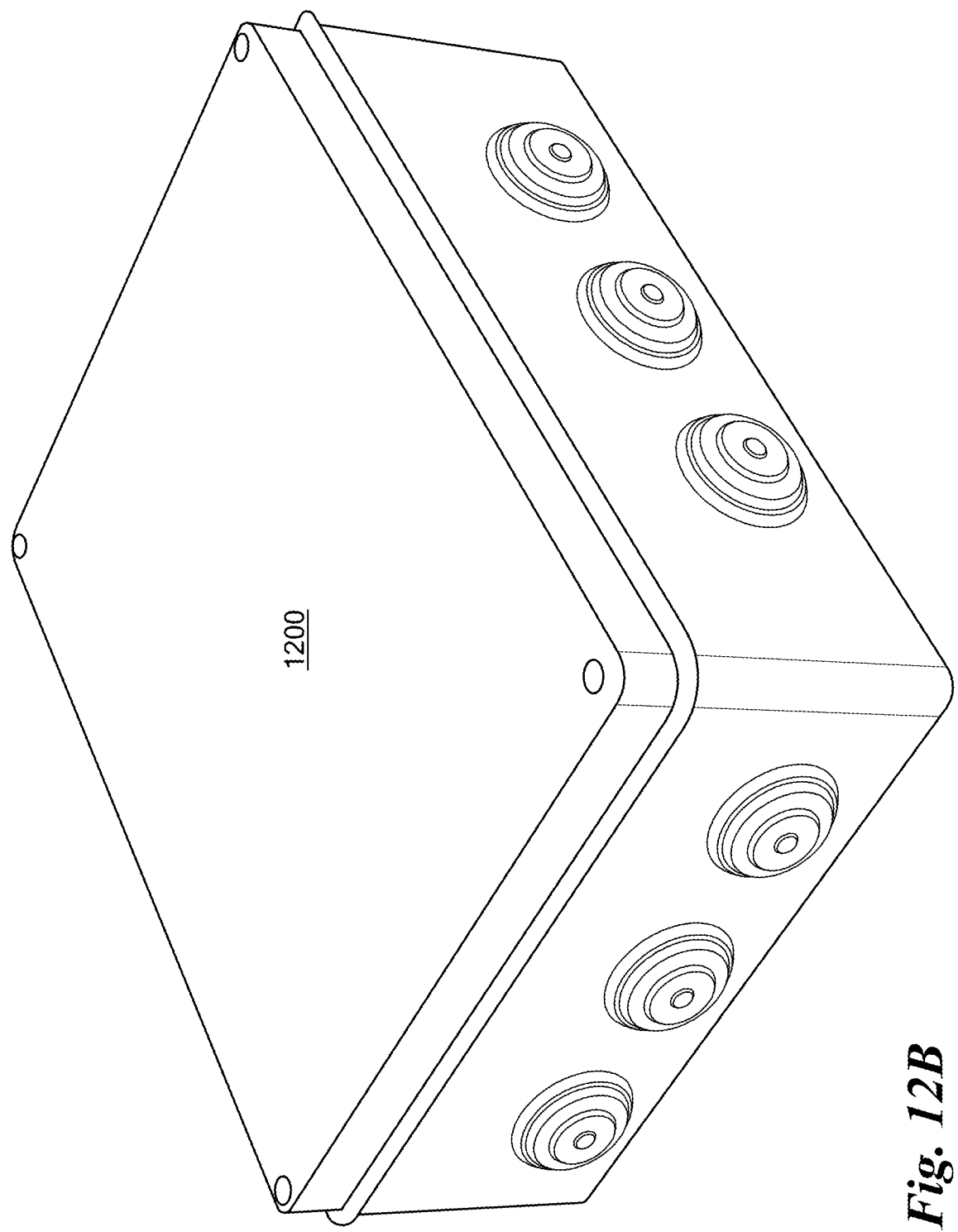
FIG. 12B shows a photo of an example enclosure for a system for an automated detection of a labeled microbial pathogen on a detection surface of a disc.
Figure 12C:
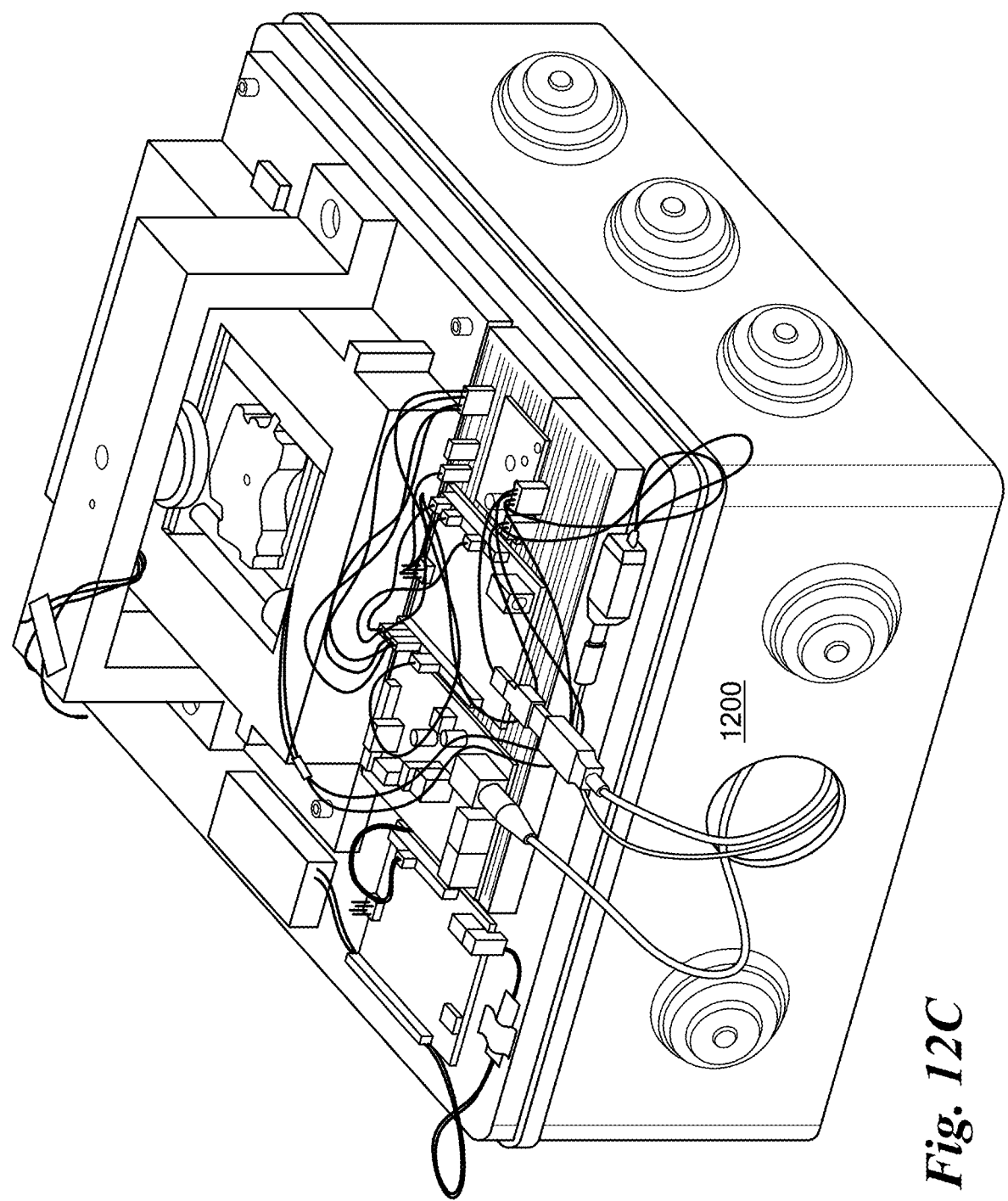
FIG. 12C shows a photo of a system for an automated detection of a labeled microbial pathogen on a detection surface of a disc on top of the enclosure of FIG. 12B.
Figure 12D:
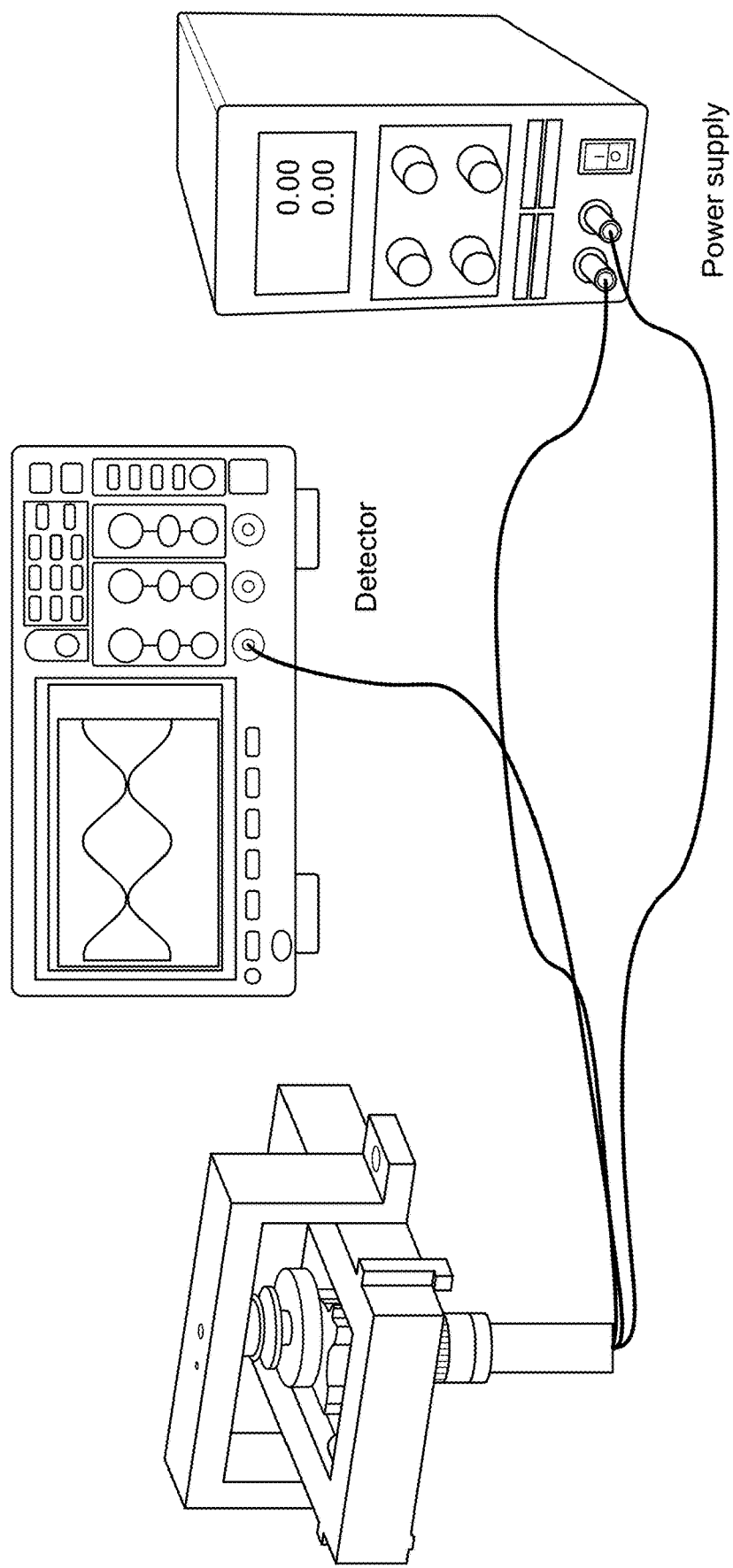
FIG. 12D shows a PMT at bottom of an optical subsystem attached to a detector and a power supply.

OPU technology, typically found within Blu-ray DVD players, was utilized. OPU, in combination with further optical modifications and linear and spindle motor assemblies, has the potential to produce highly accurate test results within two minutes. FIG. 12C shows a photo of a prototype device. FIG. 11A (left) shows a CAD rendering of this device. A prototype of the detection system was built using elements found in a blu-ray player and using custom 3D-printed parts. Quantum dots were conjugated to a glass sample plate to represent fluorescently tagged SARS-CoV-2. FIG. 12D shows a PMT at bottom of an optical subsystem attached to a detector and a power supply. The PMT in the system was connected to a detector (oscilloscope) for testing.

Verification tests will account for FDA Limit of Detection recommendations and accuracy requirements for COVID-19 tests (U.S. Food & Drug Administration, 2020a), as well as industry standards such as I.S.O. 15193:2009, which specifies requirements for the content of a reference measurement procedure for in vitro diagnostic devices. For this validation, the sample models with conjugated quantum dots will be run through the TurboFISH detection device to demonstrate a Blu-ray OPU diagnostic system.

First, each test sample disc will be run multiple times at a low speed to show that the system can detect the same patterns of Qdots and demonstrate the repeatability of results. Then, each sample disc will be subjected to runs at increasing speeds to determine the number of photons collected at each speed and determine the maximum speed at which fluorescence can still be detected by the system. Since the PMT can theoretically detect as little as one photon, there are not anticipated issues in achieving a target rotational speed of 4000 RPM to about 5000 PRM.

Since the amount of Qdots on the plate is known, it can be predicted from the results of the validation what would be expected for a real exhaled breath sample. This validation data and statistical data on the distribution and quantity of exhaled viral particles collected on the plate can be used to determine the kind of results the system will output as a positive sample is scanned. Scanning a certain amount of area and finding these results would indicate a positive test, without having to scan the entire sample if an immediate positive is found. Implementing these statistical calculations in a future iteration of the scanning programs will decrease the run time.

REFERENCES

A. R. Rahmani, M. Leili, G. Azarian, A. Poormohammadi, Sampling and detection of corona viruses in air: A mini review, Science of the Total Environment, 740 (2020) 140207.

CDC guidance: cdc.gov/coronavirus/2019-ncov/lab/resources/antigen-tests-guidelines.html X. Chen, R. Li, Z. Pan, C. Qian, Y. Yang, R. You, J. Zhao, P. Liu, L. Gao, Z. Li, Q. Huang, L. Xu, J. Tang, Q. Tian, W. Yao, L. Hu, X. Yan, X. Zhou, Y. Wu, K. Deng, Z. Zhang, Z. Qian, Y. Chen, L. Ye, Human monoclonal antibodies block the binding of SARS-CoV-2 spike protein to angiotensin converting enzyme 2 receptor, Cellular and Molecular Immunology, 17 (2020) 647-649.

Y. Huang, C. Yang, X.-f. Xu, W. Xu, S.-w. Liu, Structural and functional properties of SARS-CoV-2 spike protein: potential antivirus drug development for COVID-19, Acta Pharmacologica Sinica, 41 (2020) 1141-1149.

K. Fukami, K. Fukagata, K. Taira, Assessment of Supervised Machine Learning Methods for Fluid Flows, Theoretical and Computational Fluid Dynamics, 34 (2020) 497-519.

R. Maulik, K. Fukami, N. Ramachandra, K. Fukagata, K. Taira, Probabilistic Neural Networks for Fluid Flow Model-Order Reduction and Data Recovery, Physical Review Fluids, 5 (2020) 104401.

K. Faull, J. Higginson, A. Waring, T. To, J. Whitelegge, R. Stevens, C. Fluharty, A. Fluharty, Hydrogen-deuterium exchange signature of porcine cerebroside sulfate activator protein, J Mass Spectrom., 35 (2000) 392-401.

L. Konermann, J. Pan, Y. Liu, Hydrogen exchange mass spectrometry for studying protein structure and dynamics., Chem Soc Rev., 40 (2011) 1224-1234.

T. Wales, K. Fadgen, G. Gerhardt, J. Engen, High-speed and high-resolution UPLC separation at zero degrees Celsius., Anal Chem., 80 (2008) 6815-6820.

A. Miranker, C. Robinson, S. Radford, C. Dobson, Investigation of protein folding by mass spectrometry., FASEB J., 10 (1996) 93-101.

J. Zheng, T. Strutzenberg, B. Pascal, P. Griffin, Protein dynamics and conformational changes explored by hydrogen/deuterium exchange mass spectrometry., Curr Opin Struct Biol., 58 (2019) 305-313.

K. Taira, S. L. Brunton, S. T. M. Dawson, C. W. Rowley, T. Colonius, B. J. McKeon, O. T. Schmidt, S. Gordeyev, V. Theofilis, L. S. Ukeiley, Modal Analysis of Fluid Flows: An Overview, AIAA Journal, 55 (2017) 4013-4041.

K. Taira, M. S. Hemati, S. L. Brunton, Y. Sun, K. Duraisamy, S. Bagheri, S. T. M. Dawson, C.-A. Yeh, Modal Analysis of Fluid Flows: Applications and Outlook, AIAA Journal, 58 (2020) 998-1022.

R. C. Smith, Uncertainty Quantification: Theory, Implementation, and Applications, SIAM, (2013).

J. Bin, W. S. Oates, K. Taira, Thermoacoustic Modeling and Uncertainty Analysis of Two-Dimensional Conductive Membranes, Journal of Applied Physics, 117 (2015) 064506.

The invention claimed is:

1. An analyte detection system comprising
   (i) a device for detection of a fluorescently labeled analyte deposited on a solid detection surface of a disc the device comprising:
   a rotator operative to continuously rotate the disc;
   a laser operative to irradiate the analyte on the disc with excitation light capable of exciting a fluorophore bound to the analyte, wherein the laser is mounted on a scanning mechanism and irradiates a spot on the solid detection surface while the disc is rotated and scanned radially;
   a detector coupled to the scanning mechanism and operative to detect fluorescence emission from the fluorophore during the scan; and
   an analysis module that collects fluorescence emission data from the detector and stores, analyzes, and/or transmits the data to provide a measure of the analyte deposited on the solid detection surface; and
   (ii) a device for fluorescently labeling an analyte disposed on a solid detection surface of a sample disc, the device comprising:
   a circular disc holder capable of incremental, intermittent rotation around a central axis and having an outer edge an inner edge, and an empty center region, the disc holder comprising a plurality of incrementally spaced sample disc holders disposed between the outer edge and inner edge;
   one or more stationary reagent dispensing stations disposed in the center region near the inner edge of the disc holder;
   one or more cleaning vessels disposed within the center region; and
   a control module;
   wherein each dispensing station comprises two oppositely disposed dispensing/aspirating tubes capable of rotation to access either a sample disc in the disc holder or said one or more cleaning vessels;
   wherein each dispensing station further comprises a rotation and dipping mechanism operative to place one of said dispensing/aspirating tubes above a sample disc for dispensing and/or aspirating a reagent to or from a solid detection surface of a sample disc or to place one of said dispensing/aspirating tube into said one or more cleaning vessels for cleaning; and
   wherein the control module is configured to, according to a program, incrementally and intermittently rotate the circular disc holder, actuate selected reagent dispensing stations to dispense reagents onto the disc or aspirate reagents from the disc using said dispensing/aspirating tubes, and to deposit the dispensing/aspirating tubes into said one or more cleaning vessels.

2. The system of claim 1, wherein the detector comprises a dichroic long pass filter with a reflection wavelength band in the range from about 350 nm to at least about the excitation wavelength and a transmission wavelength band comprising at least a portion of an emission wavelength range of the fluorophore.

3. The system of claim 1, wherein the detector further comprises an autofocus mechanism capable of changing a distance between the detector and the solid detection surface.

4. The system of claim 3, wherein the autofocus mechanism is capable of maintaining the detector at a constant distance from the solid detection surface during scanning of the disc.

5. The system of claim 1, wherein the laser has one or more of the following characteristics: an illumination intensity of about $10^8$ mW/mm$^2$, a spot size in the range from about 150 nm to about 250 nm, and a wavelength of about 405 nm.

6. The system of claim 1, wherein the analyte is a molecular component of a pathogenic microorganism.

7. The system of claim 6, wherein the pathogenic microorganism is a virus or bacterium that causes a respiratory disease.

* * * * *